US012553426B2

(12) United States Patent
Theisen et al.

(10) Patent No.: US 12,553,426 B2
(45) Date of Patent: Feb. 17, 2026

(54) PUMP AND DRIVE ASSEMBLY

(71) Applicant: Graco Minnesota Inc., Minneapolis, MN (US)

(72) Inventors: Matthew R. Theisen, Woodbury, MN (US); Bryan K. Colby, New Brighton, MN (US); Bryce J. Gapinski, Minneapolis, MN (US); Jeremy P. Jurmu, Buffalo, MN (US); David M. Larsen, Albertville, MN (US); Mark D. Shultz, Ham Lake, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 340 days.

(21) Appl. No.: 17/926,486

(22) PCT Filed: May 27, 2021

(86) PCT No.: PCT/US2021/034471
§ 371 (c)(1),
(2) Date: Nov. 18, 2022

(87) PCT Pub. No.: WO2021/242993
PCT Pub. Date: Dec. 2, 2021

(65) Prior Publication Data
US 2023/0184235 A1 Jun. 15, 2023

Related U.S. Application Data

(60) Provisional application No. 63/153,516, filed on Feb. 25, 2021, provisional application No. 63/151,582, (Continued)

(51) Int. Cl.
*F04B 23/02* (2006.01)
*B05B 9/04* (2006.01)
(Continued)

(52) U.S. Cl.
CPC .......... *F04B 23/023* (2013.01); *B05B 9/0413* (2013.01); *F04B 15/02* (2013.01);
(Continued)

(58) Field of Classification Search
CPC ........ F04B 15/02; F04B 53/147; F04B 53/22; F04B 23/023; F04B 17/06; F04B 17/03; F04B 53/16; F04B 53/14; B05B 9/0413
See application file for complete search history.

(56) References Cited

U.S. PATENT DOCUMENTS

| 1,713,517 A | 5/1929 | Boe |
| 2,889,857 A | 6/1959 | Ames |

(Continued)

FOREIGN PATENT DOCUMENTS

| CN | 101801836 A | 8/2010 |
| CN | 107002663 A | 8/2017 |

(Continued)

OTHER PUBLICATIONS

International Search Report and Written Opinion for PCT Application No. PCT/US2021/034466, Dated Sep. 13, 2021, pp. 30.

(Continued)

*Primary Examiner* — Peter J Bertheaud
(74) *Attorney, Agent, or Firm* — Kinney & Lange, P.A.

(57) ABSTRACT

A pump assembly includes a pump module configured to be supported by a fluid tank and a drive module configured to be supported by the pump module. The drive module is mountable to and dismountable from the pump module. The drive module provides a motive force to the pump module to power pumping by the pump module.

18 Claims, 30 Drawing Sheets

Related U.S. Application Data filed on Feb. 19, 2021, provisional application No. 63/131,655, filed on Dec. 29, 2020, provisional application No. 63/127,241, filed on Dec. 18, 2020, provisional application No. 63/032,161, filed on May 29, 2020.

(51) Int. Cl.

| | |
|---|---|
| *F04B 9/04* | (2006.01) |
| *F04B 9/12* | (2006.01) |
| *F04B 15/02* | (2006.01) |
| *F04B 17/03* | (2006.01) |
| *F04B 17/06* | (2006.01) |
| *F04B 53/14* | (2006.01) |
| *F04B 53/16* | (2006.01) |
| *F04B 53/22* | (2006.01) |

(52) U.S. Cl.
CPC .............. *F04B 17/03* (2013.01); *F04B 17/06* (2013.01); *F04B 53/147* (2013.01); *F04B 53/16* (2013.01); *F04B 53/22* (2013.01); *F04B 9/04* (2013.01); *F04B 9/12* (2013.01); *F04B 23/02* (2013.01); *F04B 53/14* (2013.01)

(56) References Cited

U.S. PATENT DOCUMENTS

| | | | |
|---|---|---|---|
| 2,895,421 A * | 7/1959 | Peeps | F01L 23/00 417/554 |
| 3,295,453 A | 1/1967 | Scott | |
| 3,502,029 A | 3/1970 | Halladay | |
| 4,009,971 A | 3/1977 | Krohn et al. | |
| 4,177,937 A | 12/1979 | Schlensker et al. | |
| 5,228,842 A | 7/1993 | Guebeli et al. | |
| 5,334,001 A | 8/1994 | Williams | |
| 5,497,812 A | 3/1996 | Orosco et al. | |
| 6,097,993 A | 8/2000 | Skupin et al. | |
| 6,168,387 B1 | 1/2001 | Able et al. | |
| 6,183,224 B1 | 2/2001 | Conatser | |
| 6,799,704 B2 | 10/2004 | Carleton | |
| 8,177,524 B1 | 5/2012 | Kieffer et al. | |
| 10,125,763 B1 | 11/2018 | St. James et al. | |
| 2007/0122301 A1 | 5/2007 | Schlecht | |
| 2008/0292481 A1 | 11/2008 | Castagnetta et al. | |
| 2013/0001243 A1 | 1/2013 | Quick | |
| 2015/0014351 A1 | 1/2015 | Grontved et al. | |
| 2016/0069344 A1 | 3/2016 | Carey et al. | |
| 2016/0186743 A1 | 6/2016 | Thompson et al. | |
| 2016/0186788 A1 | 6/2016 | Davidson et al. | |
| 2016/0319811 A1 | 11/2016 | Daniski et al. | |
| 2017/0082095 A1 | 3/2017 | Liao et al. | |
| 2017/0191563 A1 | 7/2017 | Horning et al. | |
| 2017/0198688 A1 | 7/2017 | Carideo et al. | |
| 2017/0356443 A1 | 12/2017 | Moser et al. | |
| 2018/0030967 A1 | 2/2018 | Sulzer | |
| 2020/0173430 A1 | 6/2020 | Hughes et al. | |
| 2020/0232456 A1 | 7/2020 | Plantard et al. | |

FOREIGN PATENT DOCUMENTS

| | | |
|---|---|---|
| CN | 110252538 A | 9/2019 |
| EP | 0293382 A1 | 12/1988 |
| EP | 0985825 A2 | 3/2000 |
| KR | 101686767 B1 | 12/2016 |
| WO | 8704497 A1 | 7/1987 |

OTHER PUBLICATIONS

International Search Report and Written Opinion for PCT Application No. PCT/US2021/034471, Dated Jul. 21, 2021, pp. 16.
Invitation to Pay Additional Fees for PCT Application No. PCT/US2021/034466, Dated Jul. 19, 2021, pp. 27.
International Preliminary Report for Patentability for PCT Application No. PCT/US2021/034471, Dated Nov. 17, 2022, pp. 12.
International Preliminary Report on Patentability for PCT Application No. PCT/US2021/034466, Dated Nov. 17, 2022, pp. 24.
First Chinese Office Action for Chinese patent application No. 2021800390829, dated Jul. 5, 2025, 10 pages.

* cited by examiner

PUMP AND DRIVE ASSEMBLY

CROSS-REFERENCE TO RELATED APPLICATION(S)

This application claims priority to U.S. Provisional Application No. 63/032,161 filed on May 29, 2020, and entitled "MUD AND FILLER PUMP," and claims priority to U.S. Provisional Application No. 63/127,241, filed on Dec. 18, 2020, and entitled "TRANSFER PUMP," and claims priority to U.S. Provisional Application No. 63/153,516, filed Feb. 25, 2021, and entitled "TRANSFER PUMP," and claims priority to U.S. Provisional Application No. 63/131,655, filed Dec. 29, 2020, and entitled "ELECTRIC FEED PUMP FOR A PLURAL COMPONENT SPRAY SYSTEM," and claims priority to U.S. Provisional Application No. 63/151,582, filed Feb. 19, 2021, and entitled "PUMP," the disclosures of which are hereby incorporated by reference in their entireties.

BACKGROUND

This disclosure relates generally to pumps. More specifically, this disclosure relates to modular pump components and assemblies.

Pumps are used to pump material downstream from a location, such as by pulling fluid from a container and driving the fluid downstream. The pump rod of an axial displacement pump is attached to a reciprocating drive that pushes and pulls the pump rod, thereby pumping fluid from a container and downstream. The pump rod is typically attached to the reciprocating drive by a pin passing through the pump rod and securing the pump rod to the reciprocating drive. Pinning the pump rod to the reciprocating drive or detaching the pump rod from the reciprocating drive requires loose parts and several tools and is a time-intensive process. The fluid handling components of the pumping system are typically mounted to and removed from the driving portion of the pumping system. The fluid handling portions can include pump housings that are supported by a frame or housing of the driving portion.

SUMMARY

According to one aspect of the disclosure, a pump assembly configured to pump material from a fluid tank having an opening into the fluid tank includes a pump module configured to be supported by the fluid tank and a drive module removably mountable to the pump module. The pump module includes a mounting base; a cylinder extending from the mounting base in a first axial direction along a pump axis and configured to be disposed at least partially within the fluid tank; and a piston assembly extending into the cylinder, the piston assembly configured to reciprocate along the pump axis to pump material from the fluid tank. The drive module includes a motor operably connected to the piston assembly by a dynamic interface; and a drive module support configured to interface with the mounting frame at a static interface, wherein the drive module is supported on the pump module at the static interface.

According to an additional or alternative aspect of the disclosure, a pump assembly configured to pump material from a fluid tank having an opening into an interior of the fluid tank includes a pump module configured to extend at least partially through the opening and into the fluid tank to contact a material within the fluid tank, the pump module including a piston configured to reciprocate along a pump axis to pump the material; and a drive module removably mounted to the pump module by a static interface and a dynamic interface, wherein the drive module is operatively connected to the piston at the dynamic interface to power reciprocation of the piston, and wherein the drive module is structurally supported on the pump module at the static interface; wherein the drive module is mountable to the fluid module from a plurality of orientations.

According to another additional or alternative aspect of the disclosure, a pump module configured to be supported by a fluid tank and to pump fluid from the fluid tank includes a mounting base configured to interface with the fluid tank to support the pump module relative to the fluid tank; a piston assembly extending into the fluid tank, the piston assembly configured to reciprocate along a pump axis to pump material from the fluid tank, wherein a connecting end of the piston assembly extends in a first axial direction out of the mounting base; and a projection extending from the mounting base in the first axial direction.

BRIEF DESCRIPTION OF THE DRAWINGS

FIG. 16B is a cross-sectional view of the pump assembly taken along line B-B in

FIG. 16A and with a motor housing removed.

DETAILED DESCRIPTION

The present disclosure relates generally to pumps. The pump system of the present disclosure is a modular pumping system having a pump module assembly supported by a reservoir that contains the fluid for pumping. A drive module can be mounted to and dismounted from the fluid tank while the pump module remains mounted to the reservoir and positioned for pumping.

Figure 1:
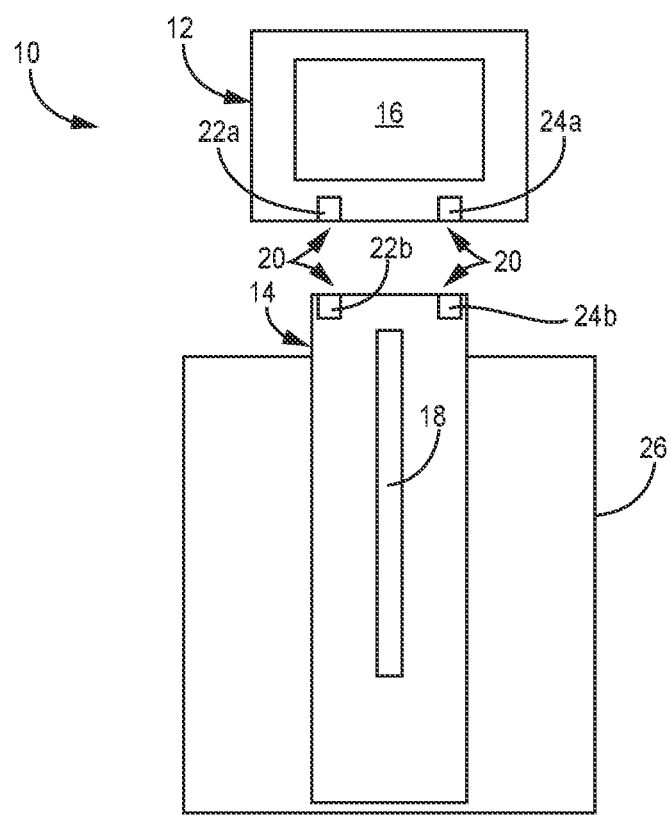
FIG. 1 is a schematic block diagram of a modular pump assembly.

FIG. 1 is a schematic block diagram of pump assembly 10. Pump assembly 10 includes drive module 12 and pump module 14. Drive module 12 includes motor 16. Pump module 14 includes fluid displacement member 18. Coupling 20 connects drive module 12 to pump module 14 and includes dynamic interface components 22a, 22b and static interface components 24a, 24b. Fluid tank 26 is shown.

Pump assembly 10 is configured to pump liquids, such as oil, mud, food, resin, isocyanate, paint, varnish, finishes, stain, water, etc. from a fluid reservoir, such as a bucket, drum, or other container, to a downstream location, such as a dispensing tool, spray gun, reservoir, other pump, etc. Pumping assembly 10 can be powered in any desired manner to pump the liquid. For example, pumping assembly 10 can be electrically powered, pneumatically powered, and/or hydraulically powered, among other options. In some examples, pump assembly 10 does not rely on any external mechanical input to power pumping.

Drive module 12 is configured to provide motive power to pump module 14 to cause pump module 14 to pump the material. Drive module 12, including power components (e.g., the electric components in examples that include electric components, pneumatic switching valves in examples that include a pneumatic motor 16, etc.), is separate from pump module 14 to isolate the power components of drive module 12 from the pumped material. In the example shown, drive module 12 can be removably mounted to pump module 14. Drive module 12 is configured to be structurally supported by pump module 14. Pump module 14 is supported, wholly or partially, by fluid tank 26 and is configured to directly contact the material in the reservoir during pumping. At least a portion of pump module 14 can be submerged in the material during pumping.

Motor 16 generates a mechanical output to cause pumping by pump module 14. Motor 16 is configured to cause movement of fluid displacement member 18 to cause pumping by pump module 14. In some examples, motor 16 can cause linear reciprocating movement of fluid displacement member 18 to power pumping. For example, fluid displacement member 18 can be a piston or a diaphragm configured to reciprocate along an axis to pump the material. In some examples, the motor 16 is configured to generate a rotational output, though it is understood that not all examples are so limited. For example, motor 16 can generate a rotational output and a drive can covert the rotational output to a linear motion provided to fluid displacement member 18. A conversion drive can be connected to motor 16 to convert the rotational motion output from the motor 16 to a linear reciprocating motion that is provided to fluid displacement member 18 to drive reciprocation of fluid displacement member 18, such as an eccentric crank, scotch-yoke, screw-and-nut, among other options. In other examples, motor 16 can be a linear actuator, such as a solenoid or a pneumatic or hydraulic driver. In some examples, a motor axis of the motor 16, on which the rotating component of motor 16 rotates or along which the linearly displacing member of motor 16 displaces, can be aligned with the reciprocation axis of fluid displacement member 18 with drive module 12 mounted to and supported by pump module 14.

Drive module 12 is configured to mount to pump module 14 at coupling 20. Drive module 12 is structurally supported by pump module 14 at coupling 20 and drive module 12 provides mechanical motion (e.g, reciprocating motion) to drive movement of fluid displacement member 18 at coupling 20. Coupling 20 includes a dynamic connection interface and a static connection interface. Pump module 14 is mechanically connected to drive module 12 at coupling 20. The dynamic interface and the static interface facilitate mounting of drive module 12 to pump module 14 such that drive module 12 is supported by pump module 14 and can provide motive power to pump module 14 to power pumping by pump module 14. Drive module 12 can be separated from pump module 14, such as by breaking the static and dynamic interfaces that form coupling 20, without breaking any electrical, pneumatic, and/or hydraulic connections. Pulling drive module 12 off of pump module 14 breaks only mechanical connections between drive module 12 and pump module 14.

The dynamic interface is formed by a connection between a dynamic component 22a of drive module 12 and a dynamic component 22b of pump module 14. Drive module 12 provides motive power to pump module 14 by the dynamic interface. For example, fluid displacement member 18 can form the dynamic component 22b of pump module 14 that interfaces with a reciprocating member of drive module 12 that forms the dynamic component 22a of drive module 12. The fluid displacement member 18 can be connected to the reciprocating member by a slotted interface, pinned interface, or in any other desired connection manner The static interface is formed by a connection between a static component 24a of drive module 12, such as a support frame, plate, etc. of drive module 12, and a static component 24b of pump module 14, such as a support frame, plate, etc. of pump module 14. Drive module 12 can be structurally supported by the pump module 14 at the static interface. Drive module 12 can be secured to pump module 14 at the static interface to prevent dismounting of drive module 12 from pump module 14.

Figure 2:
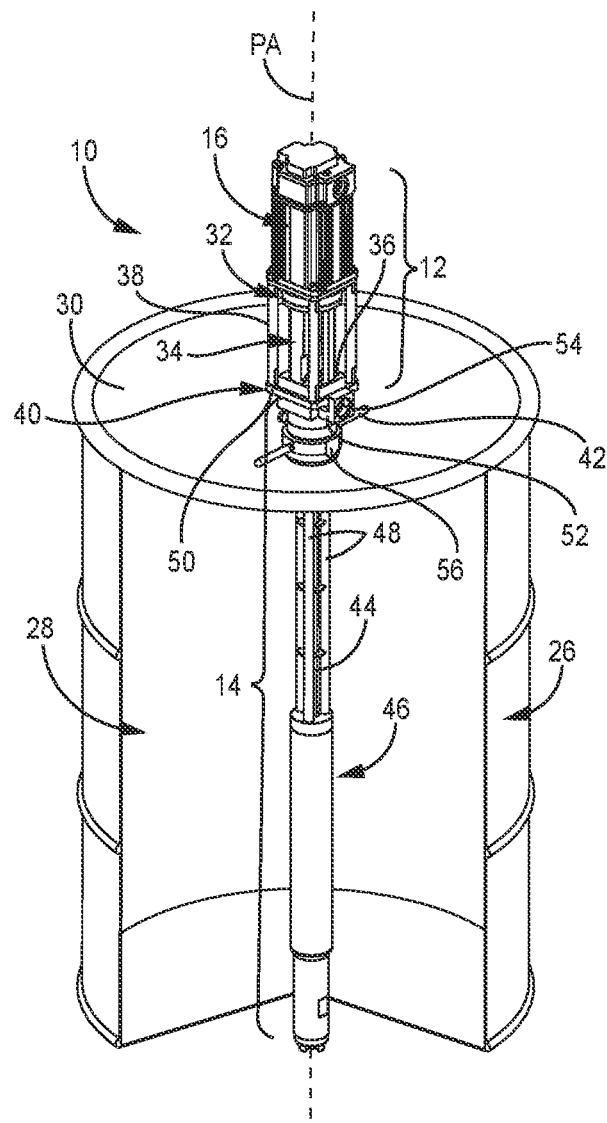
FIG. 2 is an isometric view of a pump assembly and a fluid tank with a partial cross-section of the supply drum.

FIG. 2 is an isometric view of pump assembly 10 with a partial cross-section of fluid tank 26. Fluid tank 26 includes interior 28 and top 30. Pump assembly 10 includes drive module 12 and pump module 14. Drive module 12 includes motor 16, bearing assembly 32, clocking assembly 34, upper plate 36, and tie rods 38. Pump module 14 includes mounting base 40, handles 42, drive shaft 44, cylinder 46, and tubes 48. Mounting base 40 has mounting plate 50, fluid outlet manifold 52 with outlet 54, and mounting collar 56. Axis PA of pump assembly 10 is shown.

Drive module 12 and pump module 14 are disposed coaxially on pump axis PA with drive module 12 mounted to pump module 14. Drive module 12 is mounted to and supported by pump module 14. In the example shown, upper plate 36 of drive module 12 is in contact with and supported by mounting plate 50 of pump module 14. In the example shown, upper plate 36 directly contacts mounting plate 50 to support drive module 12 on pump module 14. The interface between upper plate 36 and mounting plate 50 can form the static connection interface between drive module 12 and pump module 14. The upper plate 36 provides a structural base for drive module 12 that interfaces with the pump module 14 at the static connection interface. Upper plate 36 can also be referred to as a drive module support. It is understood that upper plate 36 and mounting plate 50 do not necessarily include flat or planar interface surfaces. Upper plate 36 and mounting plate 50 can be formed in any desired configuration suitable for interfacing to support drive module 12 on pump module 14. For example, one or both of upper plate 36 and mounting plate 50 can include blocks of material and still be considered to form plates. The upper plate 36 and mounting plate 50 do not need to interface at flat surface to be considered to form plate.

Pump module 14 is supported by fluid tank 26. In the example shown, pump module 14 is entirely supported by fluid tank 26. In some examples, no other components support pump module 14 relative to the ground surface other than fluid tank 26. Pump module 14 sits on and is supported by fluid tank 26, which fluid tank 26 also contains the fluid to be pumped by pump module 14. Pump module 14 extends through and is supported by top 30 of fluid tank 26. A portion of pump module 14 can be inserted into the interior 28 of fluid tank 26 through top 30 of fluid tank 26. Fluid tank 26 contains the material to be displaced by pump assembly 10. Cylinder 46 is at least partially submerged in the fluid. The drive shaft 44 extends into cylinder 46 to displace the fluid contacting and driving member (e.g., piston head or diaphragm). In some examples, pump module 14 includes a double displacement pump that outputs pumped material during both an upstroke and a downstroke.

In the example shown, mounting collar 56 connects pump module 14 to top 30 of fluid tank 26. Mounting collar 56 can be threaded onto top 30 of fluid tank 26, among other connection options. Handles 42 extend radially outward from mounting collar 56 relative to axis PA. Handles 42 can be part of an assembly removably mountable to mounting base 40 or can be permanently connected to or formed as part of mounting base 40. A user can use handles 42 to grip and turn pump module 14 while threading mounting collar 56 onto or off of top 30 of fluid tank 26.

Fluid outlet manifold 52 is disposed axially between motor 16 and cylinder 46 along axis PA. Tubes 48 attach cylinder 46 to fluid outlet manifold 52 and provide fluid passages that allow cylinder 46 to fluidically communicate with fluid outlet manifold 52.

Tie rods 38 extend from upper plate 36 and support motor 16. In some examples, tie rods 38 mechanically attach upper plate 36 directly to a housing of motor 16. In other examples, tie rods 38 attach upper plate 36 to a housing of bearing assembly 32 that is connected to the housing of motor 16. Bearing assembly 32 is disposed axially between motor 16 and fluid outlet manifold 52 and is disposed coaxially on axis PA with motor 16. Bearing assembly 32 is disposed axially between motor 16 and fluid tank 26. Clocking assembly 34 is, in the example shown, disposed axially between bearing assembly 32 and fluid outlet manifold 52 and is disposed coaxially with bearing assembly 32 on axis PA. Clocking assembly 34 is disposed axially between motor 16 and top 30 of fluid tank 26. As discussed in more detail below, a drive connects drive shaft 44 with motor 16 to receive a driving output from motor 16 and to power pumping by pump module 14.

Figure 3A:
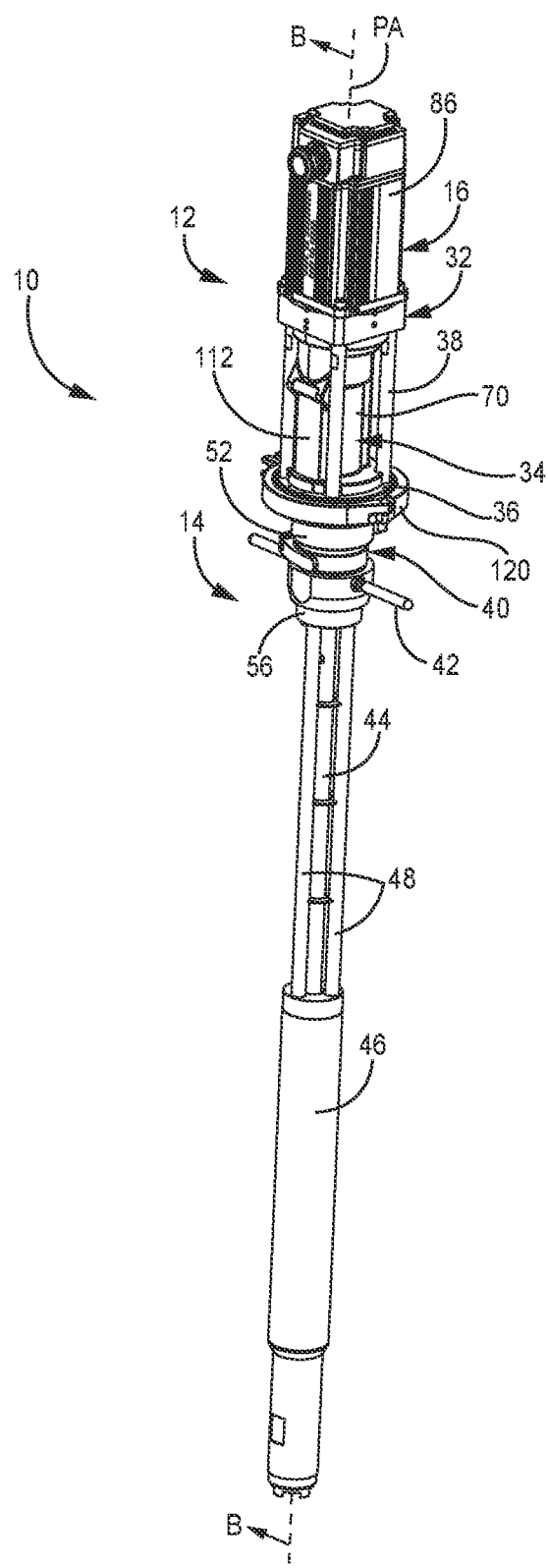
FIG. 3A is an isometric view of a pump assembly.
Figure 3B:
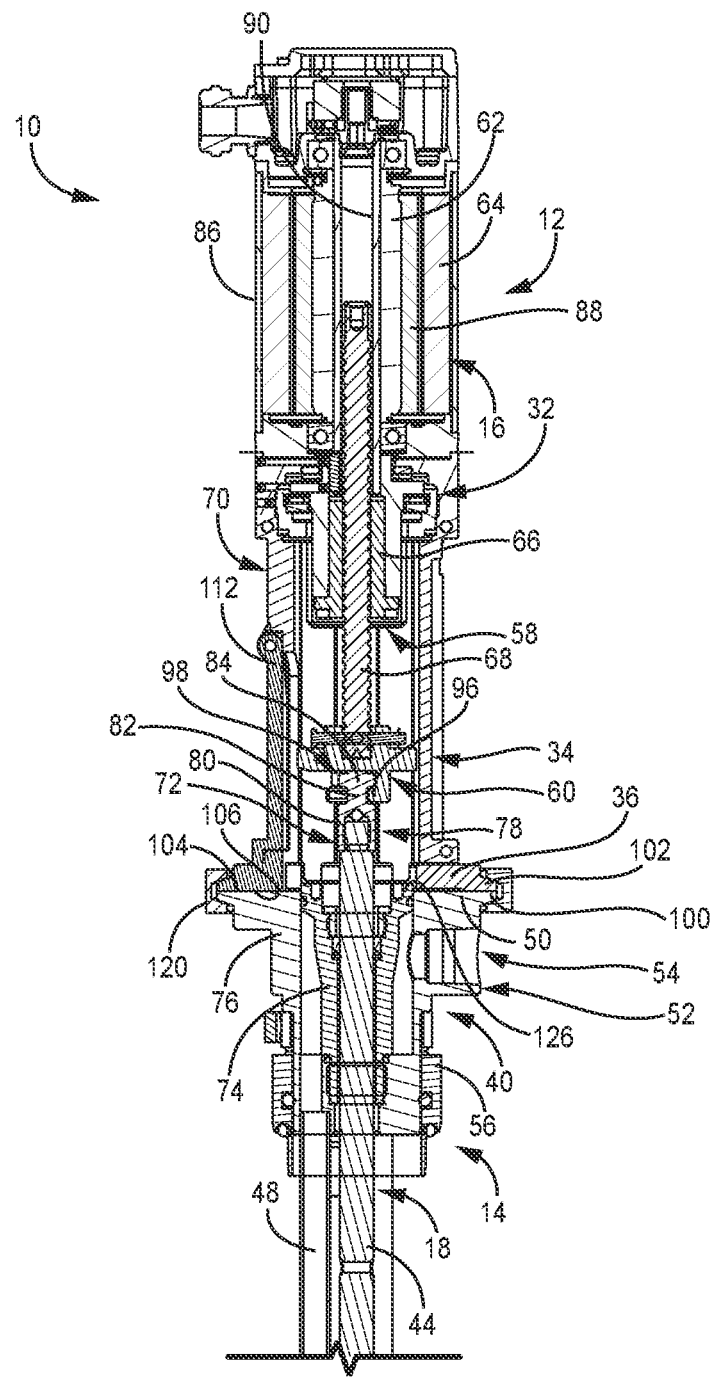
FIG. 3B is a cross-sectional view of a portion of the pump assembly taken along line B-B in FIG. 3A.
Figure 3C:
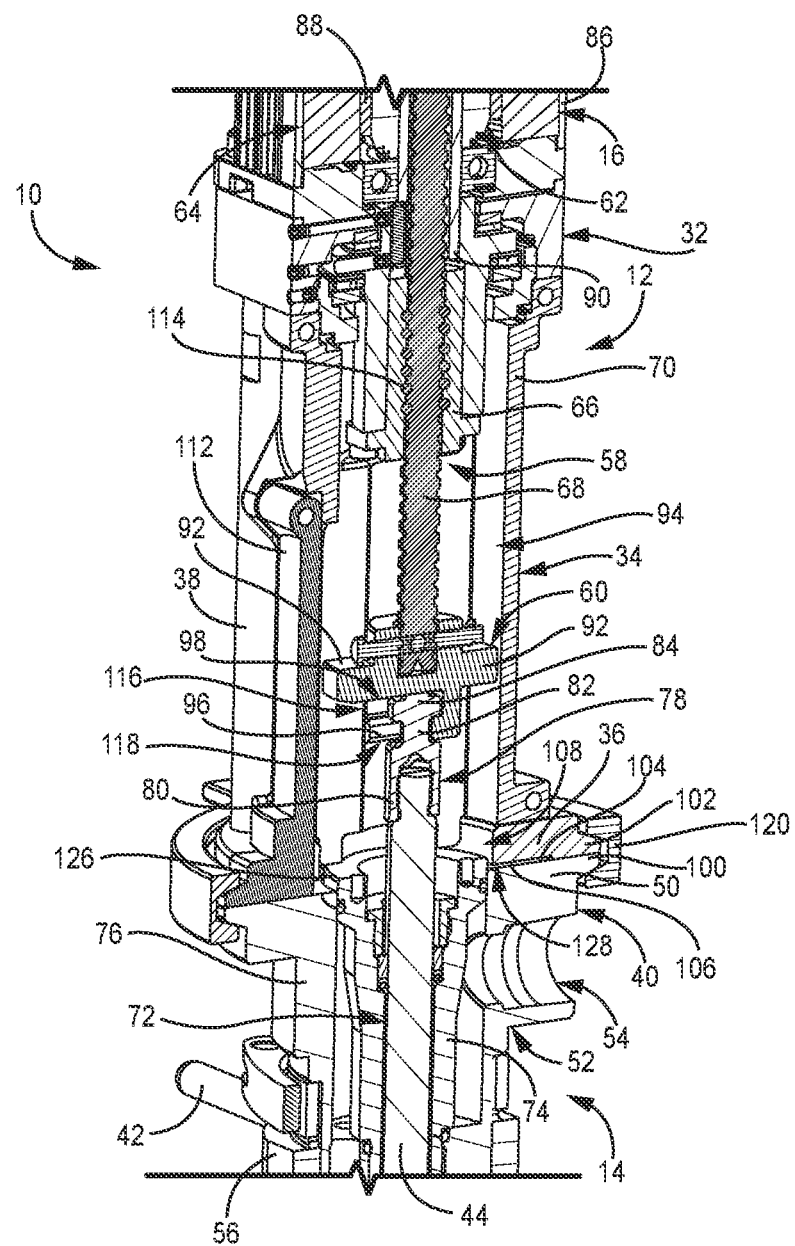
FIG. 3C is an isometric cross-sectional view of a portion of the pump assembly taken along line B-B in FIG. 3A.

FIG. 3A is an isometric view of pump assembly 10. FIG. 3B is a cross-sectional view of a portion of pump assembly 10 taken along line B-B in FIG. 3A. FIG. 3C is an isometric cross-sectional view of a portion of pump assembly 10 taken along line B-B in FIG. 3A. FIGS. 3A-3C will be discussed together. Pump assembly 10 includes drive module 12 and pump module 14. Motor 16, bearing assembly 32, clocking assembly 34, upper plate 36, tie rods 38, drive 58, and connector 60 of drive module 12 are shown. Motor 16 includes rotor 62 and stator 64. Drive 58 includes drive nut 66 and screw 68. Clocking assembly 34 includes clocking housing 70 and door 112. Pump module 14 includes mounting base 40, handles 42, cylinder 46, tubes 48, and piston assembly 72. Mounting base 40 includes mounting plate 50, fluid outlet manifold 52 with outlet 54, and mounting collar 56. Fluid outlet manifold 52 includes inner portion 74 and outer portion 76. Drive shaft 44 and piston cap 78 of piston assembly 72 are shown. Piston cap 78 includes cap body 80, neck 82, and head 84.

Pump assembly 10 is a module pump assembly in that drive module 12 is removable from pump module 14. In some embodiments, the drive module 12 is the only part of the pump assembly 10 that includes power components (e.g., electrical, pneumatic, hydraulic, etc.), whereas the pump module 14 is the only part of the pump assembly 10 that handles or otherwise comes into contact with the fluid being pumped and/or going into a drum (or other reservoir) and/or that directly contacts the drum (or other reservoir). As shown further herein, the drive module 12 is mounted on the pump module 14 such that the drive module 12 can be dismounted and separated from the pump module 14. The pump module 14 can remain mounted on the drum (or other reservoir) before, during, and after mounting and/or dismounting of the drive module 12. The pump module 14 can be connected to different drive modules 12, and the drive module 12 can be mounted on different pump modules 14, and operated.

In the example shown, motor 16 of drive module 12 is an electric motor. Stator 64 and rotor 62 are disposed within motor housing 86. Stator 64 includes armature windings (not shown) and is fixed to motor housing 86 such that stator 64 does not rotate about axis PA. Rotor 62 includes permanent magnet array 88 disposed on and extending circumferentially about the body of rotor 62. Rotor 62 is configured to rotate about a motor axis MA (FIG. #) within motor housing 86 in response to a current (such as a direct current (DC) signals and/or alternating current (AC) signals) through stator 64. In the example shown, the motor axis is coaxial with pump axis PA such that rotor 62 rotates on an axis coaxial with an axis of reciprocation of piston assembly 72. Rotor 62 is configured to rotate about the motor axis in response to the current through stator 64. Each of stator 64 and rotor 62 are coaxial with axis PA with drive module 12 mounted to pump module 14. Rotor 62 is disposed within stator 64 such that electric motor 16 includes an inner rotor. As such, the permanent magnet array 88 is disposed on the radially outer side of the body of rotor 62. It is understood, however, that rotor 62 could be configured such that rotor 62 is disposed around stator 64 and motor 16 is an outer rotor. In such an example, permanent magnet array 88 is mounted on a radially inner side of the body of rotor 62. Rotor 62 is configured to rotate about the motor axis MA that is coaxial with axis PA when drive module 12 is mounted to pump module 14.

Rotor 62 is connected to motor shaft 90 such that motor shaft 90 rotates with rotor 62. Motor shaft 90 is disposed coaxially with rotor 62 and extends through the body of rotor 62. Motor shaft 90 is disposed coaxially with drive shaft 44 on axis PA. Motor shaft 90 is disposed coaxially with an axis of reciprocation of the fluid displacement member of pump module (e.g., the piston formed by piston assembly 72).

Motor shaft 90 is connected to drive shaft 44 by drive 58. Drive 58 is configured to receive the rotational output from motor 16 via motor shaft 90 and to convert that rotational output into a linear input to piston assembly 72. Piston assembly 72 is configured to reciprocate along axis PA due to the linear input from drive 58. Piston assembly 72 forms the fluid displacement member 18 of pump module 14. Drive shaft 44 reciprocates axially along axis PA and is coaxial with motor shaft 90. The axis of rotation of rotor 62 (i.e., the motor axis) and the axis of reciprocation of drive shaft 44 (i.e., the pump axis) are coaxial with each other such that the motor axis and pump axis can be considered to be coaxial with a common axis.

In the example shown, drive nut 66 is connected to bearing assembly 32 to rotate with bearing assembly 32. Screw 68 extends through drive nut 66. Screw 68 is elongate along the motor axis MA and disposed on axis MA. Screw 68 extends axially through drive nut 66 and is coaxial with drive nut 66 on axis MA. Screw 68 is configured to only one of linearly translate along or rotate on axis PA. While screw 68 is generally discussed as linearly translating along axis PA, it is understood that, in some examples, screw 68 can rotate on axis PA without translating along axis PA. For example, a nut can be connected to the rotating screw 68 and the nut can be clocked to prevent the nut from rotating about axis PA, such as by clocking assembly 34. Rotation of screw 68 causes the nut to translate axially along axis PA. The nut can be connected to the fluid displacement member in cylinder 46 to cause reciprocation of that fluid displacement member along axis PA.

Rolling elements 114 are disposed radially between screw 68 and drive nut 66. Rolling elements 114 can be of any configuration suitable for causing linear displacement of screw 68 based on rotation of drive nut 66. For example, rolling elements 114 can be formed by balls or elongate rollers, among other options.

Connector 60 is connected to drive 58 to be reciprocated by drive 58. In the example shown, connector 60 is mounted to an end of screw 68 such that connector 60 reciprocates with screw 68. In the example shown, connector 60 interfaces with the inner walls of clocking housing 70 to prevent rotation of connector 60 on axis PA. In the example shown, connector 60 includes arms 92 that are disposed in grooves 94 formed in clocking housing 70. The arms 92 being disposed in the grooves 94 prevents connector 60 from rotating about axis PA. The keyed interface between connector 60 and clocking housing 70 prevents screw 68 from rotating about axis PA, causing linear motion of screw 68 and thus of piston assembly 72. Clocking assembly 34 further provides a pinch guard.

Support ledge 96 is formed at a lower end of connector 60. Slot 98 is formed in connector 60. Slot 98 is formed vertically between the body of connector 60 and support ledge 96. A mounting opening 116 is formed at at least one lateral end of slot 98. The mounting opening 116 is formed such that piston cap 78 can shift laterally into and out of slot 98 through mounting opening 116 to form and break the dynamic interface between drive module 12 and pump module 14. A lower opening 118 is formed through support ledge 96 to allow piston cap 78 to pass out of slot 98.

In the example shown, connector 60 detachably couples to the piston cap 78. Piston cap 78 is received by slot 98 to connect piston assembly 72 to drive 58. Piston cap 78 can be mounted on, or otherwise attached to, the drive shaft 44. Piston cap 78 can be attached to and disengaged from the connector 60 by reception or separation from the slot 98. When the piston cap 78 is received within the slot 98, the drive shaft 44 will linearly reciprocate with the connector 60 and the screw 68. While a slot connection is shown for forming the dynamic connection between drive module 12 and pump module 14, it is understood that other types of connection are possible, such as a removable pin extending through an aperture, among other options.

Piston cap 78 is disposed at the distal end of drive shaft 44 opposite the fluid-moving portion of piston assembly 72 (e.g., a piston head disposed within cylinder 46). Cap body 80 is disposed over an end of drive shaft 44 and receives a portion of drive shaft 44 to attach piston cap 78 to drive shaft 44. It is understood, however, that in some examples cap body 80 can include a projection received by a bore in drive shaft 44. Cap body 80 can attach to drive shaft 44 in any desired manner, either removably or permanently. For example, cap body 80 can attach to drive shaft 44 by interfaced threading, swaging, etc. Neck 82 extends from cap body 80 and has a smaller diameter than cap body 80. Head 84 is disposed at an end of neck 82 opposite cap body 80. Head 84 has a diameter larger than neck 82. Neck 82 is sized to fit in the lateral gap defined by support ledge 96 such that neck 82 can pass between head 84 disposed within slot 98 and cap body 80 disposed outside of slot 98. Neck 82 passes through the lower opening in connector 60 to connect head 84 and cap body 80. Head 84 is sized such that support ledge 96 retains head 84 within slot 98.

The drive module 12 is mounted on and supported by the pump module 14. For example, the entirety of the weight of the drive module 12 can rest on and be supported by pump module 14. The drive module 12 may be mechanically supported by only the pump module 14, which itself may be entirely supported by the fluid tank 26.

The pump module 14 includes a mounting base 40 that supports pump module 14 on fluid tank 26. In the example shown, mounting base 40 interfaces with upper plate 36 to support drive module 12. In the example shown, mounting base 40 is formed from multiple components that support pump module 14 on fluid tank 26 and interface with drive module 12. Specifically, mounting collar 56 is configured to interface with and connect to the fluid tank 26 and fluid outlet manifold 52 is supported by mounting collar 56. In the example shown, mounting collar 56 is integrally formed with fluid outlet manifold 52 and is formed on and by outer portion 76 of fluid outlet manifold 52. Outlet 54 is formed through outer portion 76 of fluid outlet manifold 52. Inner portion 74 of fluid outlet manifold extends into and interfaces with outer portion 76. Inner portion 74 can be fixed to outer portion 76, such as by interfaced threading, among other options. Drive shaft 44 extends through inner portion 74 and into the interior 28 of fluid tank 26 and drive shaft 44 interfaces with seals supported by inner portion 74. One or both of inner portion 74 and outer portion 76 can interface with portions of drive module 12 to form the static interface between drive module 12 and pump module 14. In the example shown, outer portion 76 forms the mounting plate 50 that interfaces with and supports upper plate 36 of drive module 12.

The mounting plate 50 includes a lower flange 100. The lower flange 100 extends radially away from axis PA. The lower flange 100 is contoured such that a vertical height of the lower flange 100 reduces as the lower flange 100 extends radially away from axis PA. In the example shown, the upper face of the lower flange is planar with the upper surface 104 of mounting plate 50.

The drive module 12 includes an upper plate 36. The upper plate 36 engages the mounting plate 50 to rest the weight of the drive module 12 on the pump module 14. The upper plate 36 is attached to tie rods 38 that also support the motor 16. In the example shown, the tie rods 38 extend between upper plate 36 and the housing of bearing assembly 32. The upper plate 36 includes an upper flange 102. The upper flange 102 extends radially away from axis PA. The upper flange 102 is contoured such that a vertical height of the upper flange 102 reduces as the upper flange 102 extends radially away from axis PA. In the example shown, the lower face of the upper flange 102 is planar with a lower surface 106 of upper plate 36. In the example shown, upper plate 36 is an annular ring that includes a central aperture 108 that piston assembly 72 extends through with drive module 12 mounted to pump module 14.

Upper surface 104 of the mounting plate 50 engages a lower surface 106 of the upper plate 36 to support drive module 12 on pump module 14. In some examples, both upper surface 104 and lower surface 106 include planar portions that are configured to slide relative to each other. In some examples, upper surface 104 can directly interface with lower surface 106. Fastener 120 secures drive module 12 to pump module 14 to prevent drive module 12 from moving laterally away from pump module 14. For example, the fastener 120 can prevent sliding of the drive module 12 off of the pump module 14. The fastener 120 in the example shown is a clamp. More specifically, the fastener 120 in this embodiment is a sanitary clamp. The sanitary clamp is a ring that can be tightened (about a hinge) around the mated upper flange 102 and lower flange 100 to press the upper plate 36 and the mounting plate 50 together to fix the drive module 12 to the pump module 14.

Figure 4:
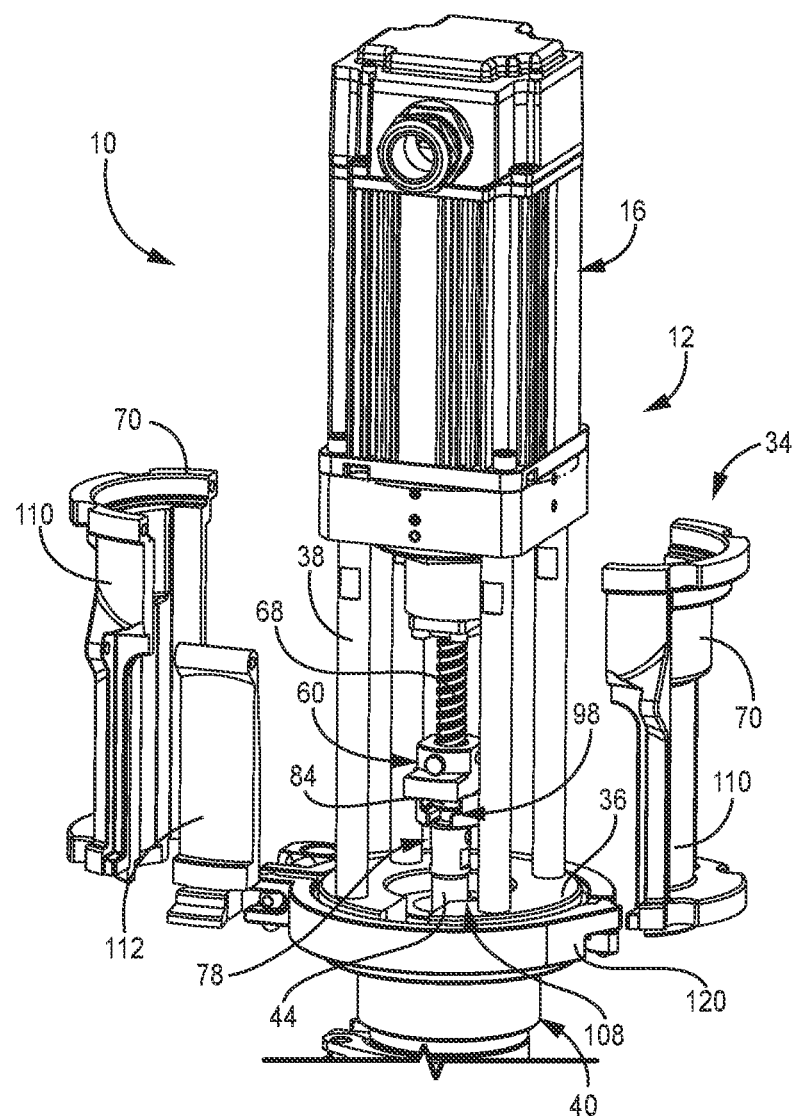
FIG. 4 is a partially exploded view of a pump assembly showing portions of a clocking housing.

FIG. 4 is a partially exploded view of pump assembly 10 showing portions of clocking housing 70. In particular, side segments 110 of the clocking housing 70 are shown. Side segments 110 can form a clamshell that comes together to form clocking housing 70. The side segments 110 can capture portions of connector 60 therebetween to form the anti-rotation mechanism for drive 58. As shown, door 112 is connected to drive module 12. Door 112 is configured to move between a closed state (best seen in FIGS. 5 and 6) and an open state (best seen in FIGS. 7A and 7B). In the example shown, door 112 is configured to pivot between the closed state and the open state. Door 112 is, in the example shown, mounted to the side segments 110 of clocking housing 70. Specifically, the door 112 can be pivotally sandwiched between the side segments 110 of the clocking housing 70.

As explained in more detail below, with door 112 in the open state, drive module 12 can be shifted laterally relative to the axis of reciprocation PA of piston assembly 72, and thus laterally relative to motor axis MA, to mount drive module 12 to pump module 14 and dismount drive module 12 from pump module 14. In the example shown, a portion of upper flange 102 is formed by door 112. As such, fastener 120 can engage with door 112 to maintain door 112 in the closed state. Door 112 can define at least a portion of the upper plate 36 such that upper plate 36 is a complete ring with door 112 in the closed state and upper plate 36 is a broken ring with door 112 in the open state. Door 112 being in the open state opens a gap in upper plate 36 that drive shaft 44 can pass laterally through during mounting and dismounting of drive module 12. Clocking assembly 34, including both side segments 110 and door 112, can remain mounted to drive module 12 as drive module 12 is mounted to pump module 14 and as drive module 12 is dismounted from pump module 14.

Figure 5:
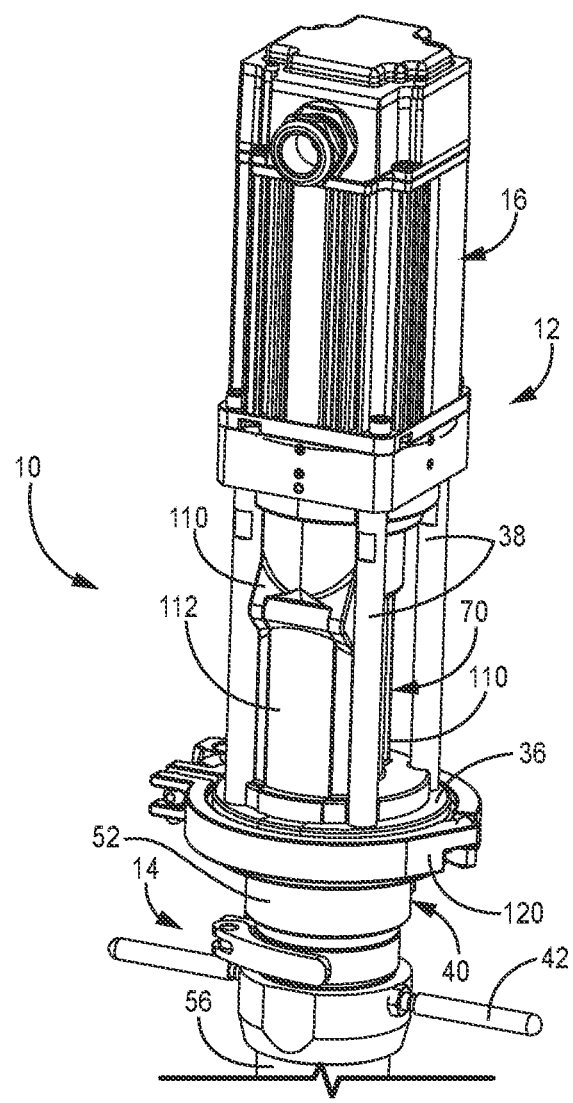
FIG. 5 is an isometric view showing a drive module mounted to and supported by a pump module.

FIGS. 5-9 show a progression of dismounting of the drive module 12 from the pump module 14. FIG. 5 is an isometric view showing drive module 12 mounted to and supported by pump module 14. FIG. 5 shows the state of pump assembly 10 that pump assembly 10 is ordinarily in during pumping. Fastener 120 is in the secured state to secure drive module 12 to pump module 14. Door 112 is in the closed state and maintained closed by fastener 120 interfacing with a portion of door 112.

Figure 6:
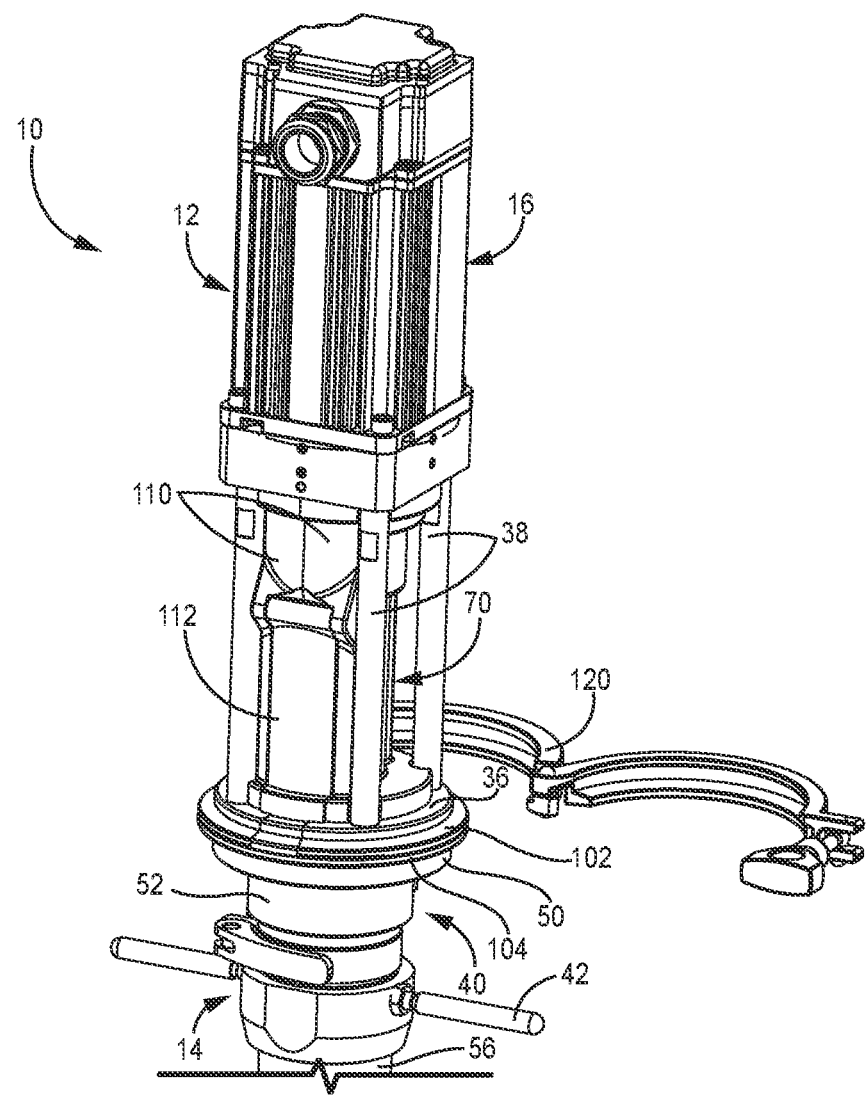
FIG. 6 is an isometric view of a pump assembly showing removal of a fastener.

FIG. 6 is an isometric view of pump assembly 10 showing removal of the fastener 120. In the case of a sanitary clamp, a threaded member can be turned by a knob to decrease tension allowing the annular fastener 120 to swing open as two hinged semicircle portions. During mounting, the threaded member can be turned to increase tension to hold fastener 120 closed and secure drive module 12 to pump module 14. In the view shown in FIG. 6, fastener 120 is unsecured and removed from pump assembly 10.

Figure 7A:
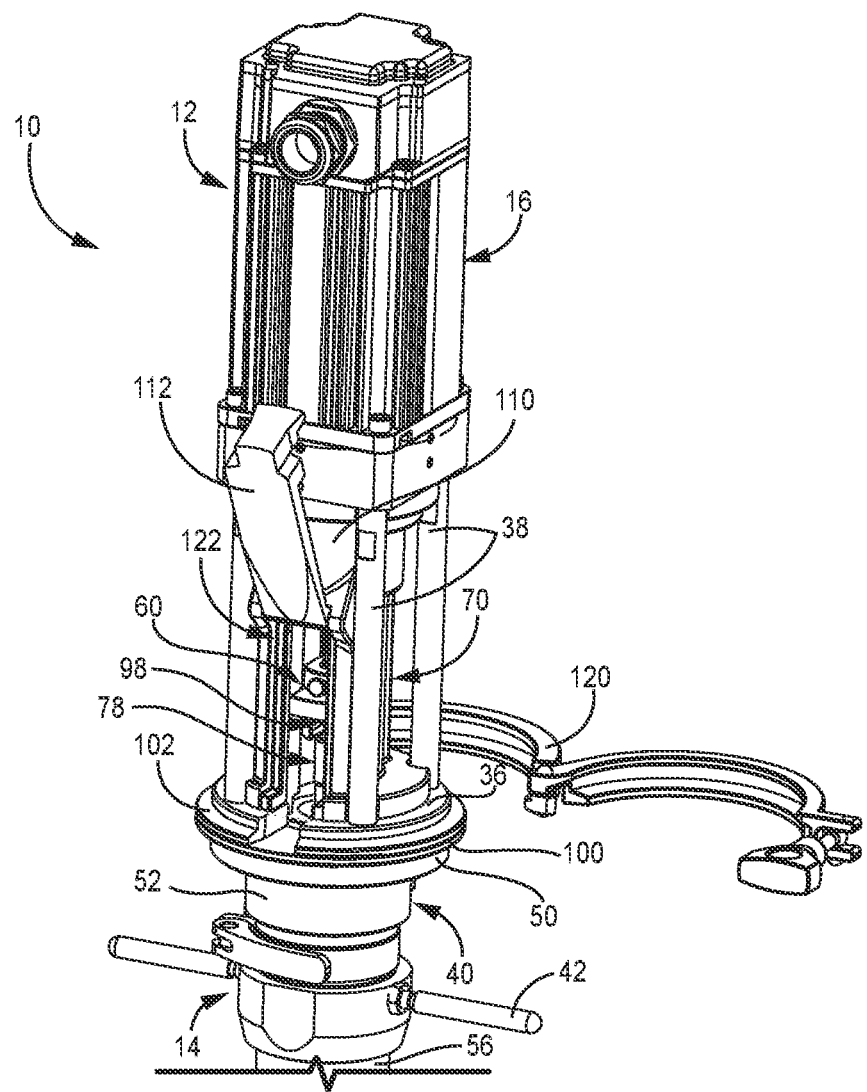
FIG. 7A is a first isometric view of a pump assembly showing a fastener removed and a door in an open state.
Figure 7B:
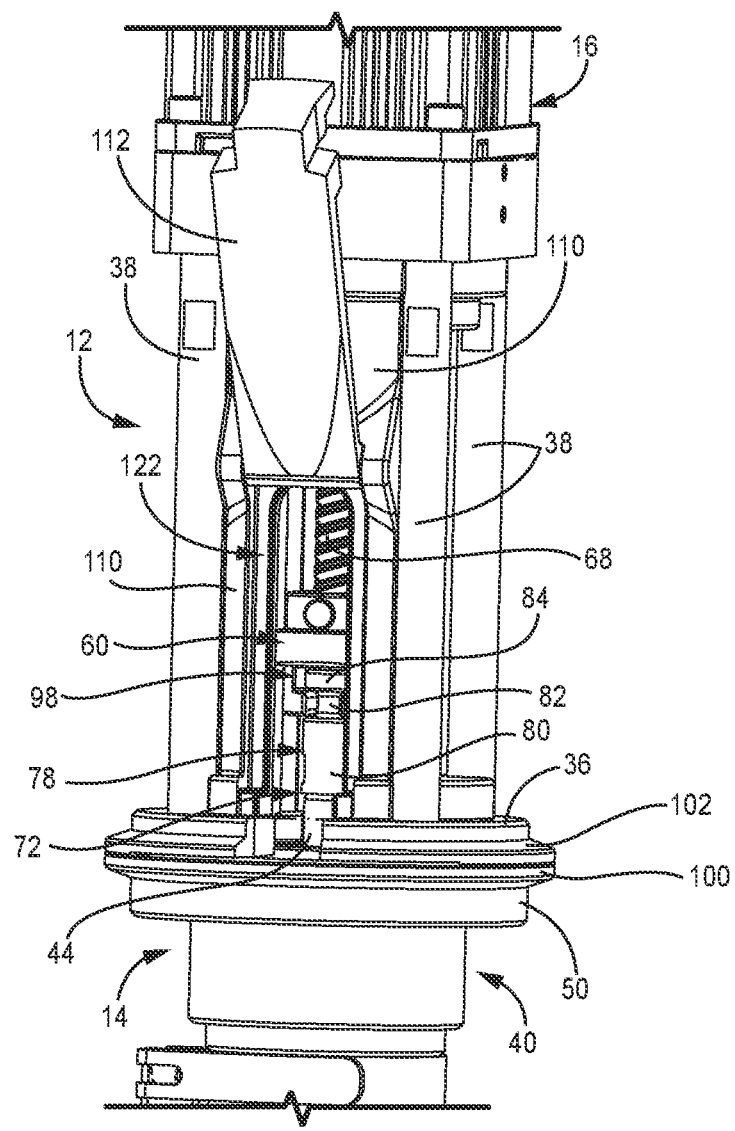
FIG. 7B is a second isometric view of the pump assembly showing the fastener removed and the door in the open state.

FIG. 7A is a first isometric view of pump assembly 10 showing fastener 120 removed and door 112 in the open state. FIG. 7B is a second isometric view of pump assembly 10 showing fastener 120 removed and door 112 in the open state. Door 112 can pivot between the closed state and the open state. The door 112 can pivot upwards as shown. The door 112 is hinged between the side segments 110 of the clocking housing 70. Pivoting of the door 112 exposes the connector 60 and the piston cap 78 within the clocking housing 70 through door opening 122. Door opening 122 is formed by the removal of door 112 from between side segments 110 forming clocking housing 70. Door opening 122 includes the gap in the annular ring of upper plate 36. In the example shown, the door opening 122 is defined not only by a gap in the clocking housing 70, but also a gap in the upper plate 36. Door opening 122 facilitates lateral movement of drive module 12 between being mounted to pump module 14 and dismounted from pump module 14.

Figure 8:
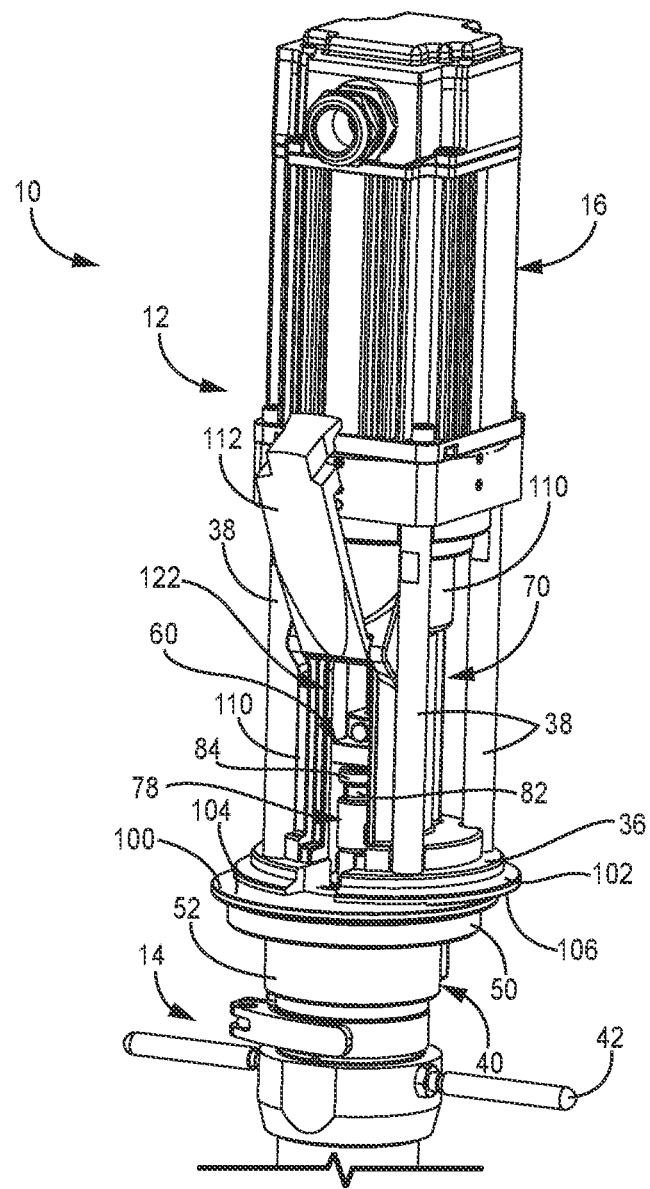
FIG. 8 is an isometric view of a pump assembly with a drive module slid laterally relative to a pump module.

FIG. 8 is an isometric view of pump assembly 10 with drive module 12 slid laterally relative to the pump module 14. In particular, the lower surface 106 of the upper plate 36 slides relative to the upper surface of the mounting plate 50. The direction of sliding is such that the head 84 moves out of the slot 98 of the connector 60 and the piston assembly 72 moves through the opening 122. With door 112 in the open state, drive module 12 can be slid along the mounting plate 50 to break the dynamic interface connection and the static interface connection. The dynamic connection and the static connection can be broken by a single movement of drive module 12 relative to pump module 14. In some examples, both the dynamic connection and the static connection can be simultaneously broken.

Figure 9:
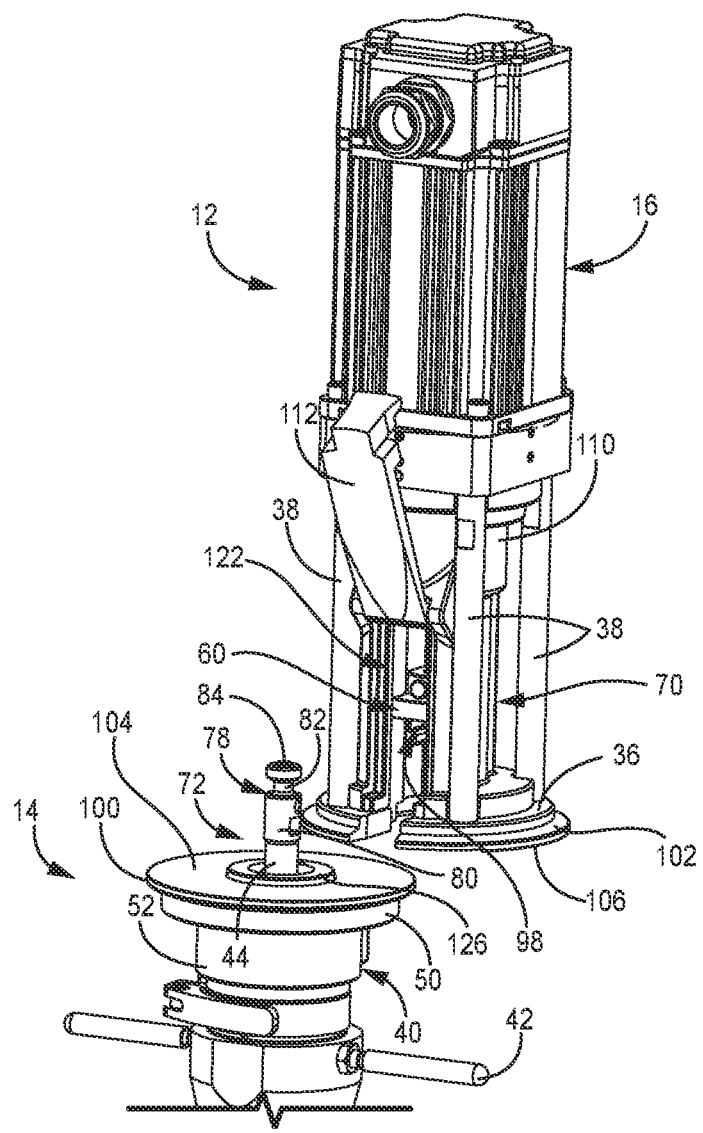
FIG. 9 is an isometric view of a pump assembly with a drive module entirely disengaged from a pump module.

FIG. 9 is an isometric view of pump assembly 10 with drive module 12 entirely disengaged from the pump module 14. The piston assembly 72 has slid out from the door opening 122, including head 84 sliding out from the slot 98 in the connector 60. When separated, the drive module 12 can be used with a different pump module 14 and/or a different drive module 12 can be used with the pump module 14. Also, cleaning of the pump module 14 can be easier after removal of all components of the drive module 12. For example, removing drive module 12 can remove all electrical components such that pump module 14 can be sprayed down or otherwise cleaned without concern for water or other cleaning solution contacting electrical components.

It is understood that pump module 14 can be mounted to and supported at least partially by the fluid tank 26 during mounting and dismounting of drive module 12, as discussed above. As such, a user needs to manipulate and maneuver only drive module 12 during assembly and disassembly of pump assembly 10. The user does not need to position, support, manipulate, or otherwise interact with pump module 14 while mounting and dismounting drive module 12.

Drive module 12 can be mounted to pump assembly 10 by the reverse steps of those described with regard to FIGS. 5-9. Drive module 12 is initially in the state shown in FIG. 9 where drive module 12 is entirely removed from pump module 14. Drive module 12 is positioned relative to pump module 14 such that piston assembly 72 is aligned with door opening 122.

Drive module 12 is shifted onto pump module 14 as shown in FIG. 8, such as by sliding upper plate 36 along mounting plate 50. More specifically, lower surface 106 slides along upper surface 104. The portions of lower surface 106 contacting upper surface 104 can be planar, and the portions of upper surface 104 contacting lower surface 106 can be planar. Piston assembly 72 shifts through door opening 122. Drive module 12 continues to shift laterally, in a direction orthogonal the axis of reciprocation PA of pump module 14. In the example shown, drive module 12 is shifted in a direction transverse to the axis of rotation of motor 16. More specifically, drive module 12 can be shifted orthogonal to the axis of rotation of motor 16.

Drive module 12 shifts relative to pump module 14 such that head 84 of piston cap 78 is received in slot 98 of connector 60, as shown in FIGS. 7A and 7B. Piston cap 78 interfacing with connector 60 forms the dynamic connection between drive module 12 and pump module 14. In some examples, a locking interface 124 (best seen in FIGS. 12A and 12B) between drive module 12 and pump module 14 locks the static interface formed between upper plate 36 and mounting plate 50, as discussed in more detail below. For example, the locking interface 124 can be formed by a projection formed on one of the drive module 12 and the pump module 14 that interfaces with a receiver formed on the other one of the drive module 12 and the pump module 14. The locking interface 124 can prevent drive module 12 from shifting vertically relative to pump module 14 while the locking interface 124 is engaged. In some examples, the locking interface 124 can prevent drive module 12 from shifting vertically relative to pump module 14 until the dynamic interface between connector 60 and pump connector 60 is broken.

Door 112 is shifted from the open state to the closed state, as shown in FIG. 6. Fastener 120 is mounted around upper flange 102 and lower flange 100 and secures drive module 12 to pump module 14. Pump assembly 10 is thereby assembled and secured together for operation.

FIG. 9 further shows upper surface 104 of the mounting plate 50. As shown in FIG. 9, projection 126 extends vertically from mounting plate 50. Projection 126 projects vertically above the upper surface 104 of the mounting plate 50. In the example shown upper surface 104 is formed as an annular ring centered on the reciprocation axis PA of the piston assembly 72. Upper surface 104 can be planar between an outer radial edge of upper surface 104 and projection 126. Projection 126 can be centered on the reciprocation axis PA of piston assembly 72. Both projection 126 and upper surface 104 can be centered on pump axis PA. In some examples, projection 126 and upper surface 104 are formed as concentric circles. Projection 126 can be used to engage and guide sliding movement of the drive module 12 relative to the pump module 14.

Figure 10:
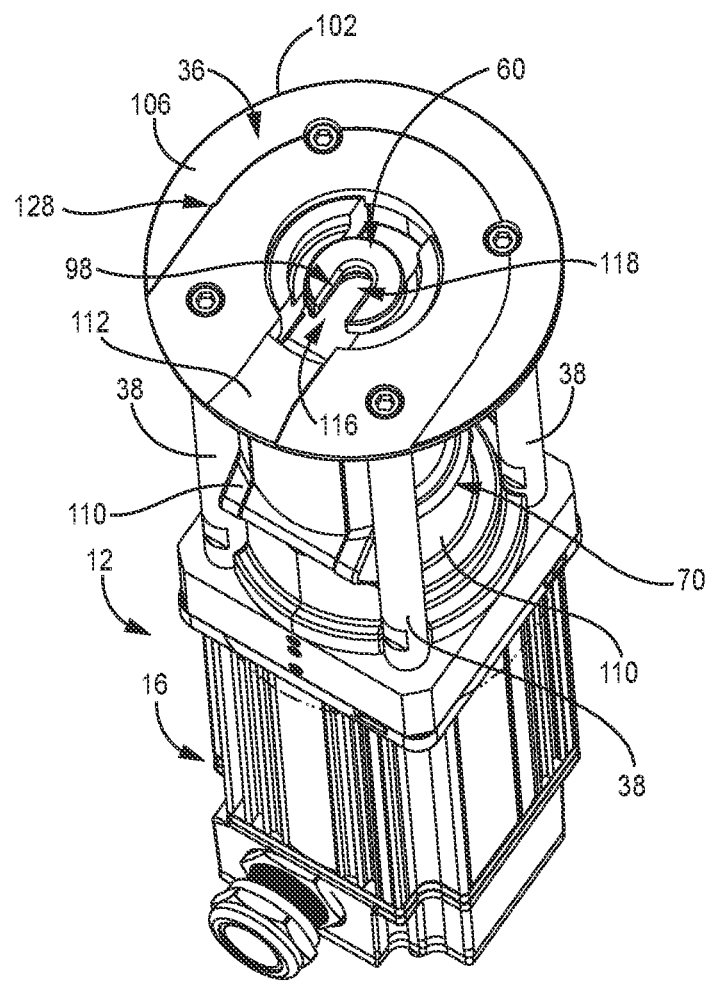
FIG. 10 is an isometric view of a drive module from a bottom side of the drive module.

FIG. 10 is an isometric view of drive module 12 from a bottom side of drive module 12. Lower surface 106 of the upper plate 36, best seen in FIG. 10, can engage with and slide along upper surface 104 of mounting plate 50. Laterally inside of the upper surface 104 is a recess 128 in the upper plate 36. The recess 128 is formed relative to the upper surface 104. The recess 128 includes an arcuate profile in the upper surface 104 that can assist in guiding the drive module 12 on to the pump module 14, and that can form a stop to further sliding motion of the drive module 12 relative to the pump module 14. In some examples, recess 128 is U-shaped. The legs of the arcuate recess 128 can guide drive module 12 and the base of the arcuate recess 128 can stop lateral movement of drive module 12. Recess 128 is partially defined by upper surface 104 and extends to the outer radial edge of upper plate 36. In some examples, a bottom surface of door 112 is planar with upper surface 104. In some examples, a bottom surface of door 112 is planar with recess 128.

Being arcuate and, in some examples U-shaped, the recess 128 includes only one opening forming the inlet/outlet for sliding disengagement because the projection 126 can only slide out from one that one opening area. It is noted that the drive module 12 can ordinarily not be lifted off of the pump module 14 because head 84 is wider than the lower opening 118 through the slot 98 of the connector 60, such that only sliding of the drive module 12 off of the pump module 14 in a particular direction will disengage the head 84 from the slot 98 and thus remove projection 126 from the recess 128. In the example shown, the sliding direction to disengage head 84 from slot 98 is transverse to both the axis of reciprocation PA of piston assembly 72 and the axis of rotation of motor 16.

As best seen in FIGS. 3B and 3C above, projection 126 and upper plate 36 limit lateral movement of drive module 12 relative to pump module 14 during mounting. Projection 126 can project further vertically away upper surface 104 than recess 128 extends vertically away from lower surface 106. In some examples, door opening 122 is sized such that projection 126 can pass through door opening 122 while drive module 12 shifts purely laterally. In some examples, pump assembly 10 is configured such that projection 126 is wider than opening 122. In any example, drive module 12 shifts laterally relative to pump module 14 during mounting to engage the dynamic connection and during dismounting to disengage the dynamic connection.

During mounting in examples where projection 126 is wider than opening 122, door 112 is in the open state and drive module 12 is shifted to align piston assembly 72 with opening 122. Drive module 12 can be tilted such that the motor axis (e.g., the axis of rotation of motor 16 or axis of reciprocation of a pneumatic drive element) is transverse to the axis of reciprocation of the piston assembly 72. Drive module 12 is shifted laterally and recess 128 moves over projection 126. Drive module 12 is shifted further laterally until projection 126 is disposed in central aperture 108. Projection 126 passing into central aperture 108 can cause drive module 12 to seat on pump module 14. Drive module 12 is shifted further to cause piston cap 78 to engage with connector 60 and, in some examples, to engage the locking interface 124 between drive module 12 and pump module 14.

The drive module 12, while mounted on the pump module 14, can be rotated about the pump axis PA while the drive module 12 is entirely supported by the pump module 14, so long as fastener 120 is not connected. As such, the drive module 12 can be mounted on the pump module 14 with drive module 12 in a first orientation. Drive module 12 can be slid onto the pump module 14 while in the first orientation. Drive module 12 can be rotated relative to the pump module 14 while the dynamic interface is connected and while pump module 14 supports drive module 12. Drive module 12 can be rotated from the first orientation, which is used for mounting and dismounting, to a second orientation used during operation. The fastener 120 can engage to prevent relative rotation of the drive module 12 and the pump module 14. Drive module 12 can be mounted from any orientation and then rotated to the operational orientation. For example, fluid tank 26 can be disposed in tight quarters such that there are limited options for approaching pump module 14 to mount drive module 12. Such a tight area can require mounting from an orientation where controls, cords, connections (e.g., electric, pneumatic, hydraulic, etc.) of drive module 12 are inaccessible or inconvenient to access. Rotating drive module 12 while mounted to pump module 14 allows drive module 12 to be conveniently mounted and dismounted and then placed in a desired orientation for operation where the controls or other connections are accessible.

The interface between drive module 12 and pump module 14 provides significant advantages. The pump module 14 can be mounted in the drum in any orientation and the drive module 12 can then be mounted on the pump module 14 in any orientation 360-degrees about the pump axis PA. While the pump module 14 can be approached from any direction, the drive module 12 can slide on and off of pump module 14 only in one direction, aligning the head 84 of piston cap 78 with the slot 98 of the connector 60. The drive module 12 can be rotated between a mounting/dismounting orientation and an operational orientation while drive module 12 is mounted to and supported by pump module 14. Pump assembly 10 can be used in cramped areas, such as at construction sites, at worksites, on trailers, in processing plants, etc. The user can approach pump module 14 from any orientation 360-degrees about pump module 14 to mount drive module 12. Drive module 12 can then be rotated to the desired operational position, which may be most convenient for connecting power to drive module 12 (e.g., electrical power cords, pneumatic lines, hydraulic lines, etc.). Drive module 12 can then be secured in the operational orientation, such as by fastener 120, and pump assembly 10 can be operated. Drive module 12 is then easily removable by rotating from the operational orientation to the dismounting orientation and then laterally shifting drive module 12 to dismount drive module 12.

Figure 11:
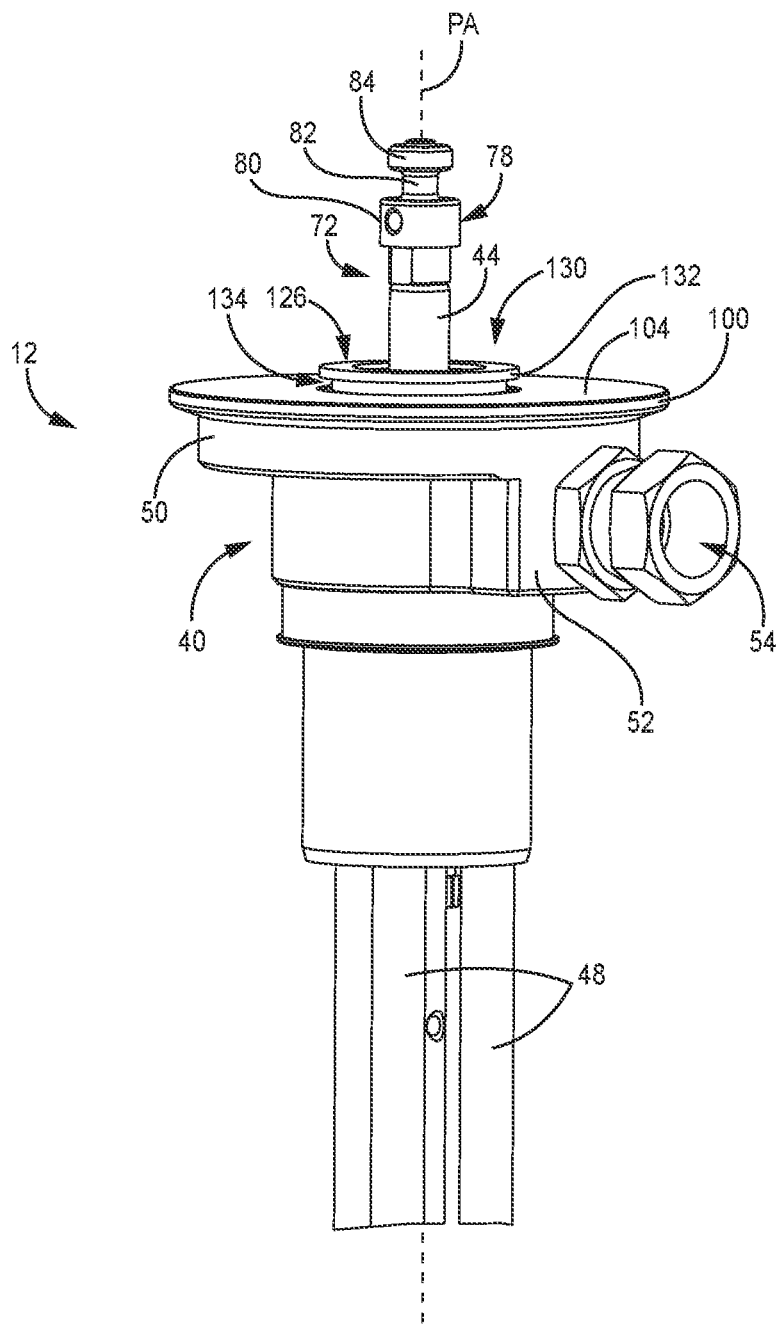
FIG. 11 is an isometric view of a portion of a pump module.

FIG. 11 is an isometric view of a portion of pump module 14. Mounting base 40, piston assembly 72, and tubes 48 of pump module 14 are shown. Mounting plate 50, fluid outlet manifold 52, and mounting collar 56 of mounting base 40 are shown. Piston cap 78 and drive shaft 44 of piston assembly 72 are shown. Piston cap 78 includes cap body 80, neck 82, and head 84. Mounting plate 50 includes upper surface 104, projection 126, and receiver 130. Projection 126 includes retaining flange 132.

Mounting plate 50 is configured to form a static support component of pump module 14, similar to static support component 24b (FIG. 1). Mounting plate 50 is formed on mounting base 40. More specifically, mounting plate 50 is formed by fluid outlet manifold 52. While fluid outlet manifold 52 is shown as forming mounting plate 50, it is understood that mounting plate 50 can be formed fully or partially by components other than fluid outlet manifold 52. It is understood that the static support component of pump module 14 can be formed by a single component part or multiple component parts fit together.

In the example shown, mounting plate 50 includes upper surface 104 and projection 126. Upper surface 104 is configured to interface with a part of drive module 12 to support a full weight of drive module 12. For example, upper surface 104 can interface with lower surface 106 of upper plate 36. In the example shown, upper surface 104 forms a planar ring extending around projection 126 and centered on pump axis PA. Projection 126 extends vertically relative to the planar flat upper surface 104. Projection 126 can be cylindrical and drive shaft 44 extends out of the interior of pump module 14 through projection 126. Projection 126 can be centered on pump axis PA.

Receiver 130 is configured to form a part of a locking interface 124 (best seen in FIGS. 12A and 12B) between pump module 14 and drive module 12. In the example shown, receiver 130 is formed by projection 126. More specifically, receiver 130 is formed by retaining flange 132 that extends laterally from projection 126. In some examples, retaining flange 132 can be formed as an annular flange extending fully around projection 126 and pump axis PA. As such, retaining flange 132 can extend a full 360-degrees around pump axis PA.

Retaining flange 132 is an overhang extending laterally away from projection 126 that defines gap 134. Gap 134 is formed vertically between the flat upper surface 104 and retaining flange 132. As discussed in more detail below, gap 134 is configured to receive a portion of drive module 12 to secure drive module 12 to pump module 14. With the portion of drive module 12 disposed in the gap 134, drive module 12 cannot be lifted vertically away from pump module 14 and must instead be shifted laterally relative to piston assembly 72 and pump axis PA to remove that portion of drive module 12 from gap 134 prior to shifting drive module 12 vertically. Receiver 130 thereby prevents vertical movement of drive module 12 relative to pump module 14.

Figure 12A:
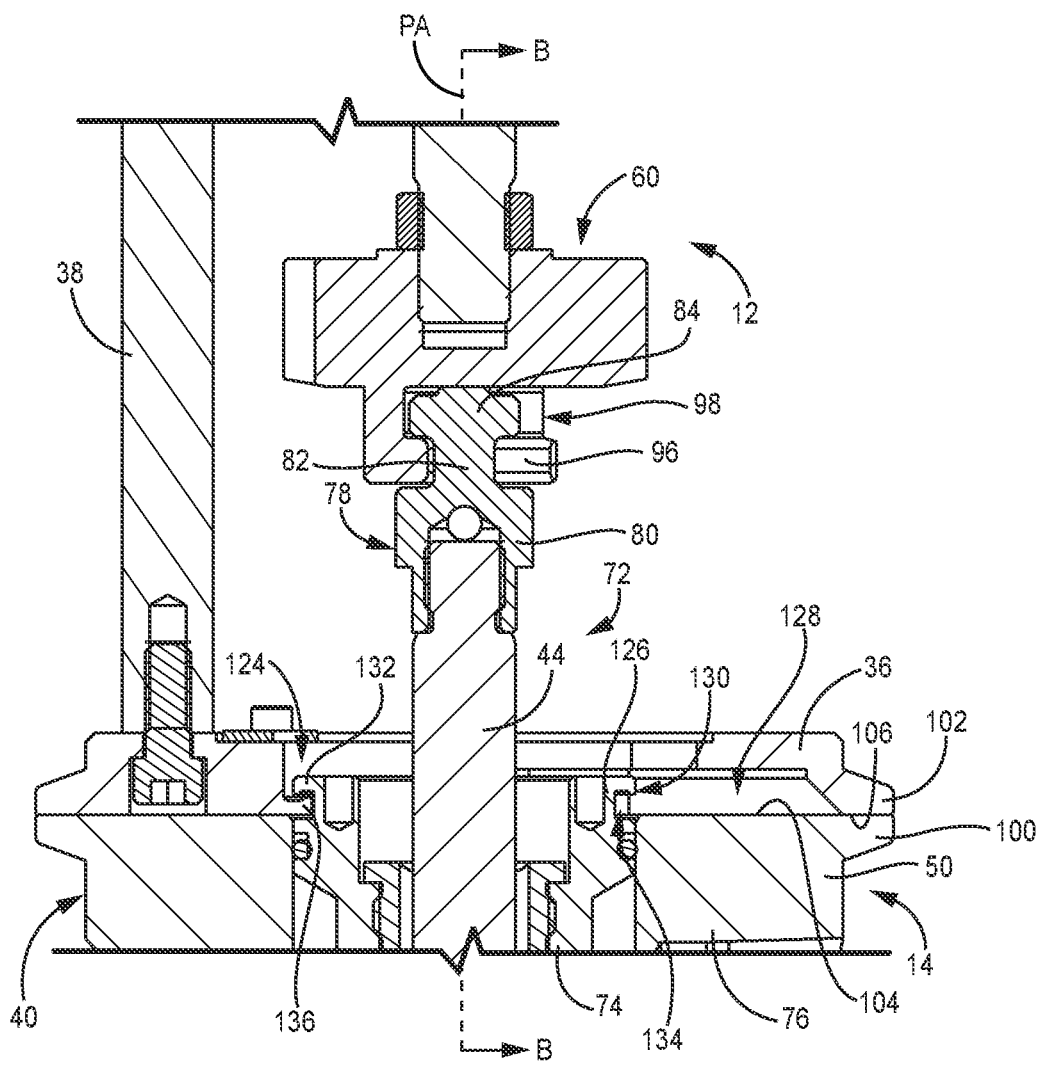
FIG. 12A is an enlarged cross-sectional view of a portion of a pump assembly taken along line A-A in FIG. 12B showing the static and dynamic interfaces between a drive module and a pump module.
Figure 12B:
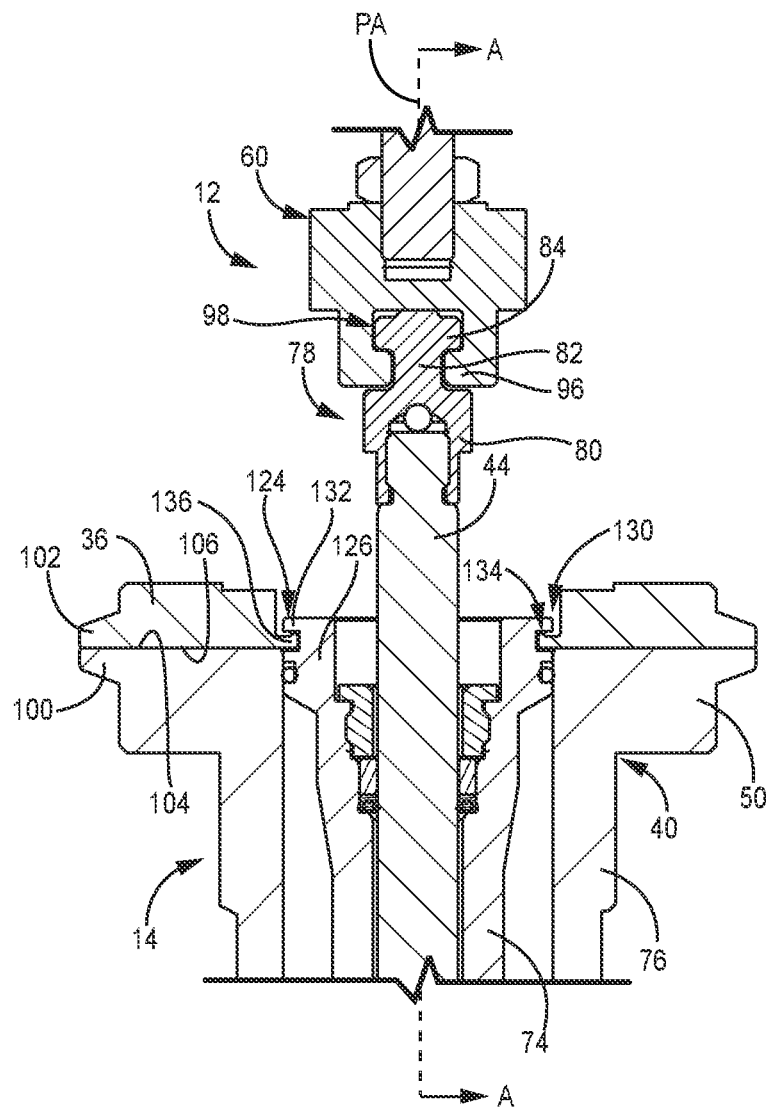
FIG. 12B is an enlarged cross-sectional view of a portion of the pump assembly taken along line B-B in FIG. 12A showing the static and dynamic interfaces between the drive module and the pump module.

FIG. 12A is an enlarged cross-sectional view of a portion of pump assembly 10 taken along line A-A in FIG. 12B showing the static and dynamic interfaces between drive module 12 and pump module 14. FIG. 12B is an enlarged cross-sectional view of a portion of pump assembly 10 taken along line B-B in FIG. 12A showing the static and dynamic interfaces between drive module 12 and pump module 14. FIGS. 12A and 12B will be discussed together. Mounting base 40 and piston assembly 72 of pump module 14 are shown. Upper plate 36 and connector 60 of drive module 12 are shown.

Mounting plate 50 is formed by portions of mounting base 40. More specifically, in the example shown mounting plate 50 is formed by portions of fluid outlet manifold 52. Upper surface 104 is formed on outer portion 76 and projection 126 is formed by inner portion 74. Inner portion 74 extends through a hole in the outer portion 76. Inner portion 74 can be fixed to outer portion 76, such as by interfaced threading at an end of inner portion 74 opposite projection 126. Inner portion 74 and outer portion 76 can define a fluid chamber therebetween that forms a portion of the flowpath between cylinder 46 and outlet 54.

Locking interface 124 is formed between receiver 130 of pump module 14 and lip 136 of drive module 12. Locking interface 124 is engaged between drive module 12 and pump module 14 with drive module 12 mounted on pump module 14. Locking interface 124 allows drive module 12 to slide laterally relative to pump module 14 but prevents drive module 12 from being displaced vertically relative to pump module 14. As such, with locking interface 124 engaged, drive module 12 can be shifted laterally relative to pump module 14 and pump axis PA but drive module 12 cannot be lifted vertically away from pump module 14.

Receiver 130 is formed by retaining flange 132 extending from projection 126. Retaining flange 132 extends radially relative to projection 126. In the example shown, retaining flange 132 extends from the upper end of projection 126. In some examples, retaining flange 132 extends fully around projection 126 such that retaining flange 132 is an annular flange. For example, retaining flange 132 can extend a full 360-degrees around projection 126. In other examples, retaining flange extends less than 360-degrees or is formed by multiple arcuate flange sections extending from projection 126. Retaining flange 132 extending fully around projection 126, whether as a single flange or as multiple flange sections, facilitates mounting drive module 12 on to pump module 14 from any desired direction around the reciprocation axis PA of piston assembly 72. Retaining flange 132 can thereby engage with lip 136 regardless of the orientation that drive module 12 mounts to pump module 14 from.

Receiving gap 134 is formed vertically between the upper surface 104 and retaining flange 132. In the example shown, both the lower edge and upper edge defining receiving gap 134 are formed by inner portion 74. It is understood, however, that the receiving gap 134 can be defined between different components, such as between an upper edge formed by inner portion 74 and a lower edge formed by outer portion 76. In some examples, projection 126, retaining flange 132, and upper surface 104 can be integrally formed as a single component.

Lip 136 is formed by upper plate 36. In the example shown, lip 136 is integrally formed with upper plate 36. It is understood, however that lip 136 can be formed in any desired manner As shown, upper plate 36 engages receiver 130 to form the locking interface 124. More specifically, the lip 136 of the upper plate 36 extends into the receiving gap 134 at least partially defined by retaining flange 132. The receiving gap 134 is aligned with the upper surface 104 (e.g. the lower edge of receiving gap 134 is planar with upper surface 104) of the mounting plate 50 so that the upper plate 36 can slide along the upper surface 104 until the lip 136 extends into receiving gap 134 to engage the locking interface 124. Such engagement of the lip 136 within the retaining gap 134 can limit motion between the drive module 12 and the pump module 14. Specifically, engagement can prevent the drive module 12 from being lifted vertically away from the pump module 14 without first sliding the drive module 12 laterally relative to the pump module 14 to disengage the lip 136 from the receiving gap 134. Retaining flange 132 forms an overhang that extends over lip 136 and can engage with lip 136 to prevent the relative vertical movement of drive module 12.

In the example shown, drive module 12 includes the receiver (e.g., retaining flange 132) and pump module 14 includes the insert (e.g., lip 136). It is understood, however that the receiver and the insert can be reversed. For example, lip 136 can be formed as part of the pump module 14 and receiver 130 can be formed as part of the drive module 12. Alternatively, the drive module 12 and the pump module 14 can include different structure for preventing the drive module 12 from lifting away from the pump module 14 without first sliding relative to the pump module 14.

The retaining flange 132 extends from the projection 126 and can be annular, extending entirely around the drive shaft 44. The head 84 of piston cap 78 likewise can have circular cross-sectional profiles 360-degrees about the pump axis PA. It is understood, however, that head 84 can be sized to rotate within slot 98 without having a circular cross-sectional profile. Due to the head 84 and the projection 126 being circular in this manner, the drive module 12 can approach and slide onto the pump module 14 from any direction, which can be convenient when the fluid tank 26 is stored in a cramped space and the user cannot approach from just any direction. In this way, the pump module 14 can be mounted in the drum in any orientation and the drive module 12 can then be mounted on the pump module in any orientation 360-degrees about the pump axis PA. While the pump module 14 can be approached from any direction, the drive module 12 can slide on and off only in one direction, aligning the head 84 of piston cap 78 with the slot 98 of the connector 60. Moreover, while retaining flange 132 prevents vertical lifting of drive module 12, retaining flange 132 does not prevent radial movement of drive module 12 relative to pump axis PA or circumferential movement of drive module 12 about pump axis PA. As such, drive module 12 can be rotated about pump axis PA to a desired orientation for operation even while locking interface 124 is engaged.

Figure 13A:
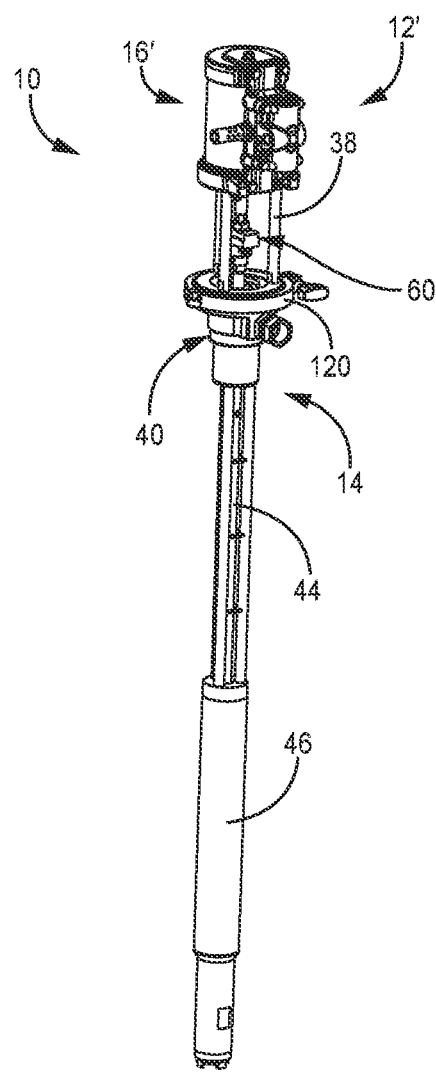
FIG. 13A is an isometric view of a pump assembly.
Figure 13B:
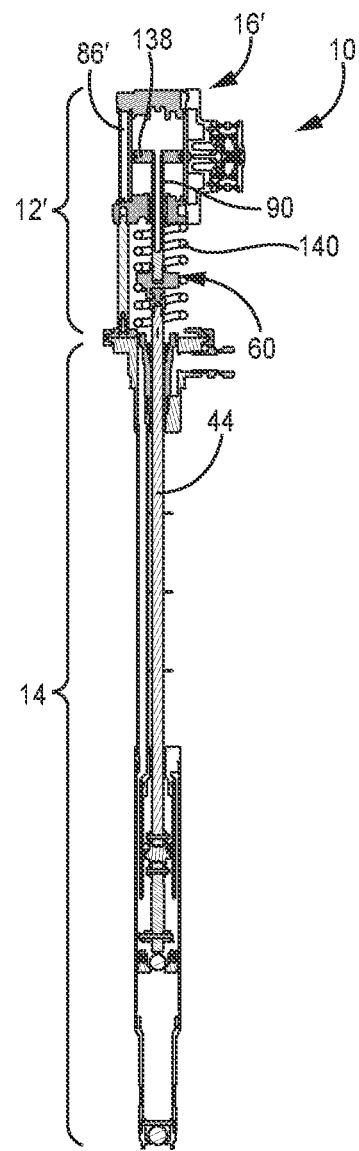
FIG. 13B is a cross-sectional view of a pump assembly.
Figure 13C:
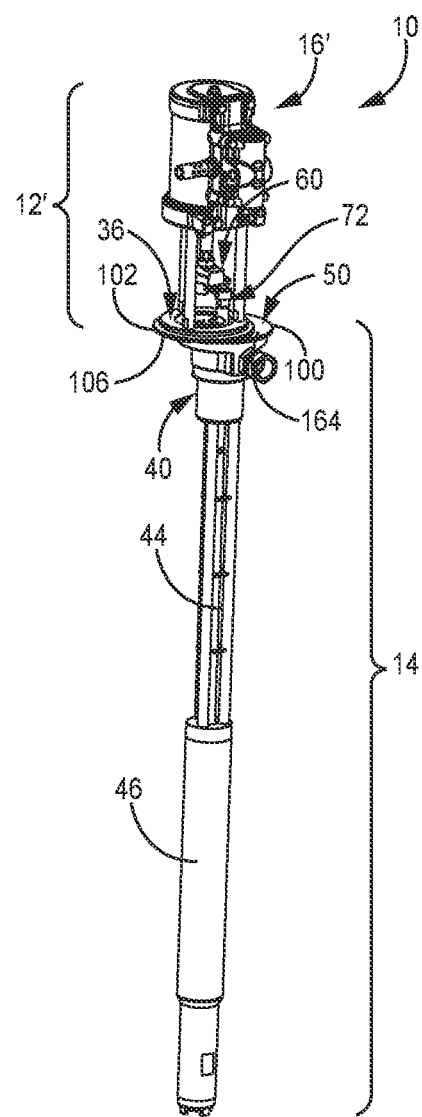
FIG. 13C is an isometric view of a pump assembly showing the drive module shifted laterally relative to the pump module.

FIG. 13A is an isometric view of pump assembly 10. FIG. 13B is a cross-sectional view of pump assembly 10. FIG. 13C is an isometric view of pump assembly 10 showing drive module 12' shifted laterally relative to pump module 14. FIGS. 13A-13C will be discussed together. Pump assembly 10 is substantially similar to the pump assemblies previously shown except that motor 16' of drive module 12' is a pneumatic drive rather than the electric motor shown in previous examples. Pneumatic motor 16' can be fed a supply of pressurized air which powers its operation to output reciprocating motion to the pump module 12'. Pneumatic motor 16' includes motor shaft 90 that is displaced linearly along the pump axis PA to displace piston assembly 72. Shaft head 138 is disposed within motor housing 86' and divides motor housing 86' into two chambers that are alternatively pressurized to cause operation of pneumatic motor 16'. Motor shaft 90 is moved downward by release of pressurized air within an upper chamber of the pneumatic drive 16' until travel actuates a valve which vents air from the upper chamber and introduces pressurized air to the lower chamber which reverses the motion of reciprocation to an upward direction. Sufficient upward travel actuates a valve again to vent air from the lower chamber and introduce pressurized air to the upper chamber, thus outputting reciprocating motion. Motor shaft 90 is connected to piston assembly 72 by connector 60. The connector 60 can be similar to the connector 60 previously shown.

Being that the pneumatic motor 16' outputs linear reciprocating motion via the motor shaft 90 instead of rotational motion like the electric motor 16, the drive module 12' does not require a clocking assembly 34. In the example shown, spring 140 (shown in FIG. 13C) extends vertically between motor housing 86' and upper plate 36 and defines a cylindrical chamber within which the interface between connector 60 and piston cap 78 is disposed and reciprocates. Spring 140 provides a pinch guard. Drive module 12' is configured to slide laterally relative to the pump module 14 during at least a portion of the mounting and dismounting processes. Specifically, the lower surface 106 of the upper plate 36 can be slid along the upper surface 104 of the mounting plate 50, which disengages the lip 136 from the receiver 130. Once the lip 136 is fully disengaged from the receiver 130 (e.g., removed out from under retaining flange 132), the drive module 12' can be lifted away from the pump module 14.

The drive module 12' is attached to the pump module 14 by fastener 120. The pump module 14 can be identical to the pump module 14 of the previous embodiments and/or can have similar features as any previously shown embodiment. The mounting configuration and arrangement disclosed facilitates mounting of different drive modules having different power types on a single pump module 14.

Figure 14:
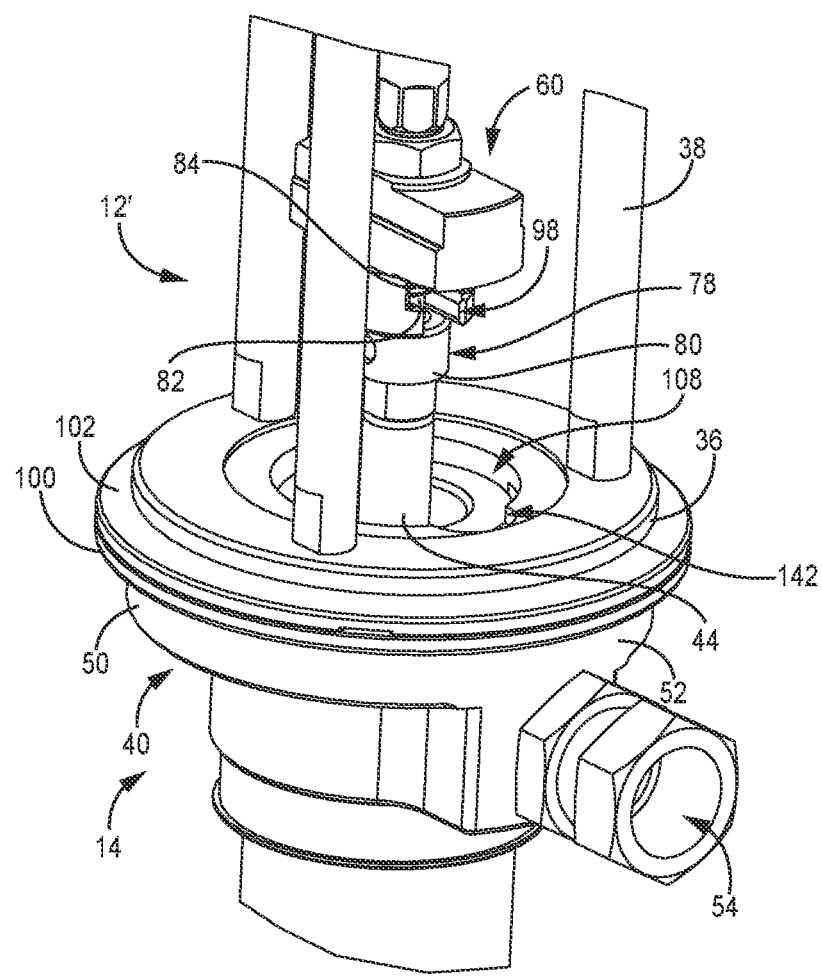
FIG. 14 is an enlarged isometric view showing an interface between a drive module and a pump module.

FIG. 14 is an enlarged isometric view showing an interface between drive module 12' and pump module 14. Fastener 120 is not shown in this view so that the upper flange 102 and the lower flange 100 can be clearly shown. The pinch guard (e.g., spring 140) is also not shown to clearly show the dynamic connection interface between connector 60 and piston assembly 72.

Drive module 12' includes an upper plate 36 while the pump module 14 includes mounting base 40. FIG. 14 shows the head 84 of piston cap 78 engaged in the slot 98 of the connector 60. Upper plate 36 includes notch 142 that is aligned with drive shaft 44. Notch 142 is aligned with drive shaft 44 such that pulling drive module 12' laterally to disengage the locking interface 124 between drive module 12' and pump module 14 can cause drive shaft 44 to enter into notch 142. Notch 142 limits the lateral displacement of drive module 12' during dismounting. Notch 142 engaging with drive shaft 44 can stop further lateral movement of drive module 12' relative to pump module 14. Notch 142 engaging drive shaft 44 provides feedback to the user that locking interface 124 is disengaged such that drive module 12' can be lifted vertically away from and off of pump module 14.

In the example shown, upper plate 36 extends fully around pump axis PA and drive shaft 44. Upper plate 36 does not include an opening or door, similar to opening 122 and door 112, such that drive module 12' is shifted vertically during a portion of the mounting and dismounting processes. It is understood, however, that drive module 12' can be configured to have a door 112 regardless of the configuration of the motor. For example, drive module 12' can include a door 112 regardless of whether the motor is a pneumatic motor, electric motor, or hydraulic motor. It is further understood that drive module 12' is shifted laterally relative to pump module 14 to both engage and break the dynamic connection between drive module 12' and pump module 14 regardless of if the mounting process includes any vertical displacement of drive module 12' relative to pump module 14.

Figure 15A:
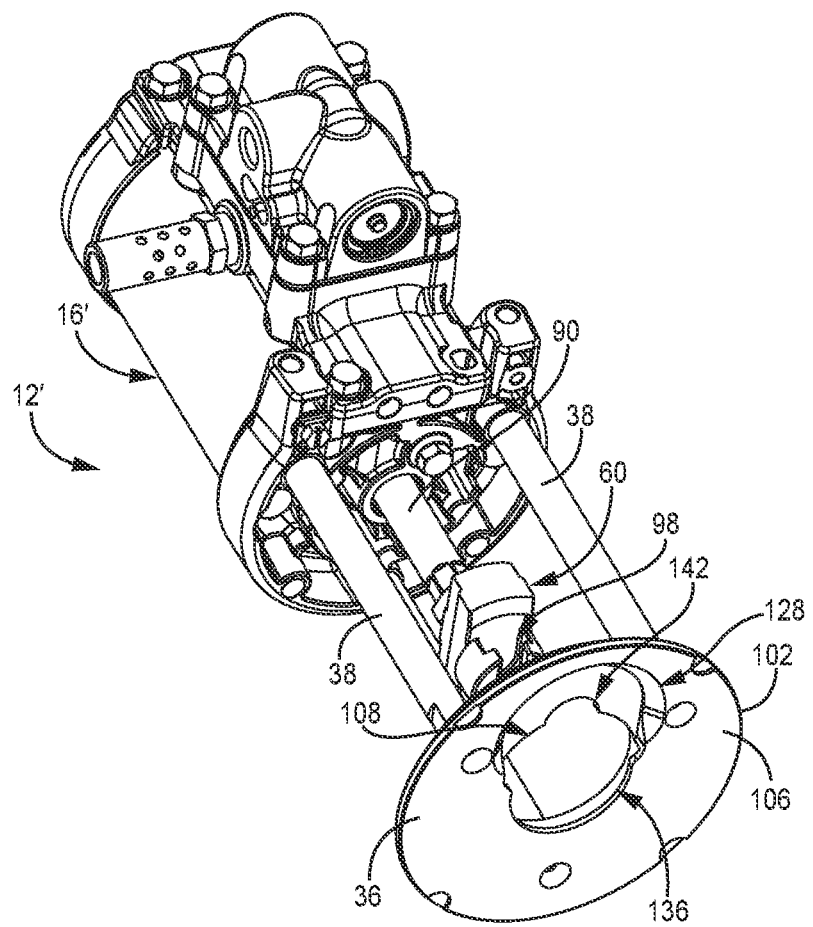
FIG. 15A is a first isometric view of a drive module.
Figure 15B:
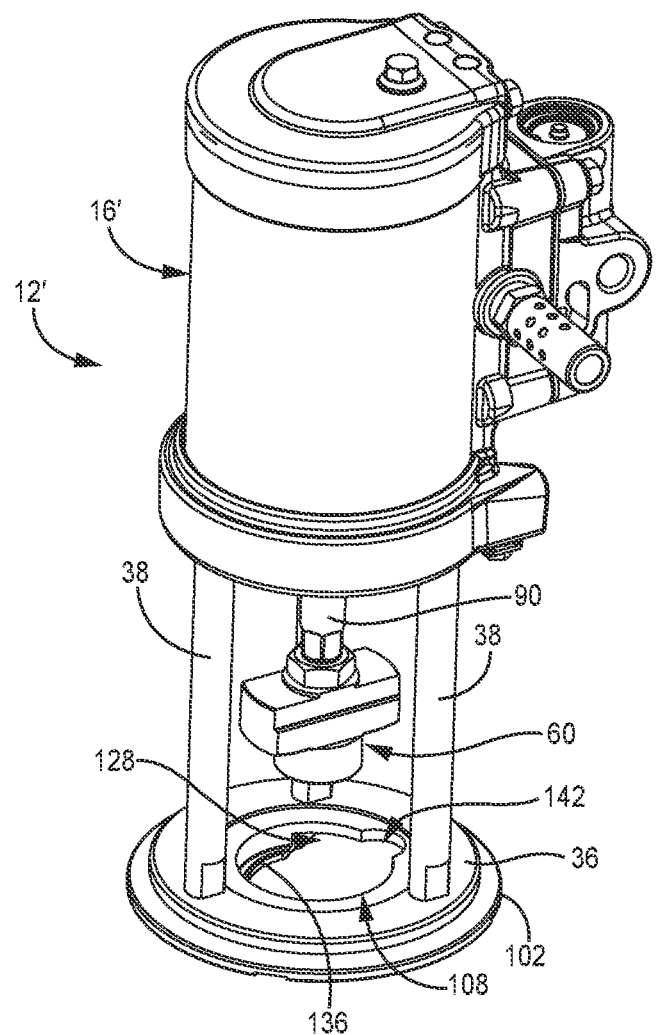
FIG. 15B is a second isometric view of the drive module.
Figure 15C:
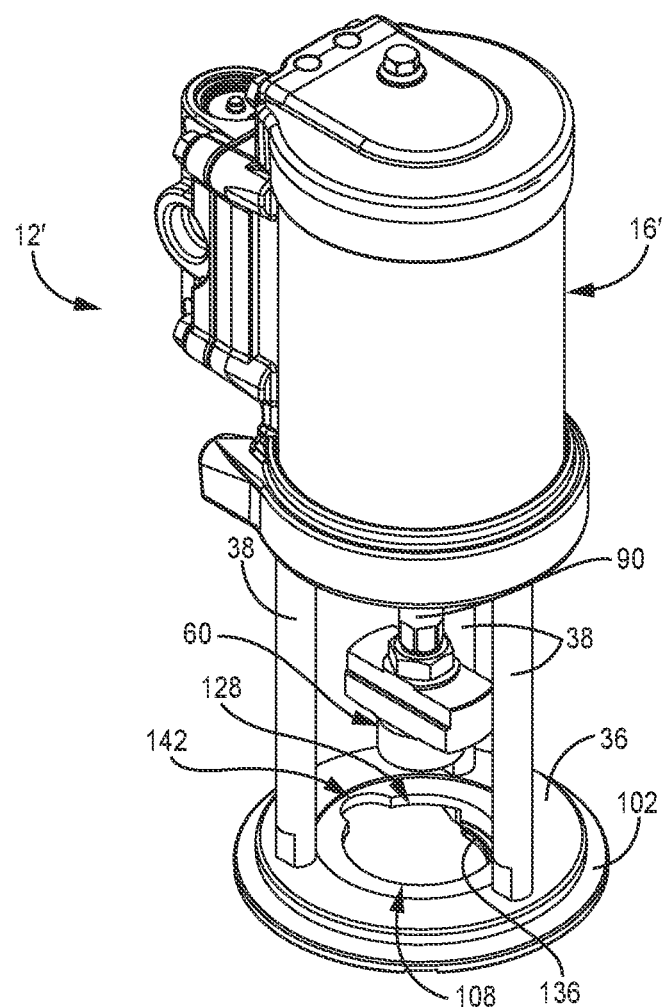
FIG. 15C is a third isometric view of the drive module.

FIG. 15A is a first isometric view of drive module 12'. FIG. 15B is a second isometric view of drive module 12'. FIG. 15C is a third isometric view of drive module 12'. FIGS. 15A-15C will be discussed together. Drive module 12' is shown as dismounted from the pump module 12. The lower surface 106 of the upper plate 36 is shown. The lip 136 can be partially formed by the lower surface 106. The sides of the arcuate shape of the lip 136 are shown. As shown, the lip 136 is U-shaped, though other shapes are possible. The arcuate shape of the lip 136 includes an open side (e.g., the portion between the two ends of the lip 136) which determines the direction in which the drive module 12' must slide onto (and off of) the pump module 12. Specifically, the drive module 12' slides to move pump axis PA into the area defined by the arcuate lip 136 to engage the lip 136 with the receiver 130, and the drive module 12' slides to move pump axis PA out of the area defined by the arcuate lip 136 to disengage the lip 136 from the receiver 130. Lip 136 extends only partially around pump axis PA. In some examples, lip 136 extends up to 180-degrees around pump axis PA, it is understood, however, that not all examples are so limited.

A recess 128 in the lower surface 106 partially defines the lip 136. Recess 128 is a depression that extends vertically into upper plate 36 from lower surface 106. Recess 128 can assist in mounting and dismounting of drive module 12' from pump module 12. As previously noted, upper plate 36 does not include a door in the example shown. As such, drive module 12' needs to be moved at least partially vertically during mounting and dismounting. Recess 128, and in some examples notch 142, facilitate the vertical movement of drive module 12'. For example, drive module 12' can be tipped onto a point of upper flange 102 on an opposite side of the motor axis from notch 142 and moved laterally towards pump module 12. Drive module 12' can then be pivoted downwards onto pump module 12. Piston cap 78 can pass within recess 128 as drive module 12' is pivoted downwards during mounting or pivoted upwards during dismounting. As such, the user may not be required to fully lift drive module 12' during mounting and dismounting. Recess 128 further provides space for projection 126 to be disposed in during the mounting and dismounting processes. Recess 128 thus allows for lateral sliding of drive module 12' to engage and disengage the locking interface 124 (best seen in FIGS. 12A and 12B).

The drive module 12', while mounted on the pump module 12, can be rotated about the pump axis PA while the pump module 12 remains mounted to the drum if the fastener 120 is not connected. As such, the drive module 12' can be mounted on the pump module 12 by sliding from a first orientation and then rotated relative to the pump module 12 to a second orientation used for pumping. Drive module 12' can be dismounted from the pump module 12 by rotating from the second orientation to the first orientation and then disengaging the locking interface 124. The fastener 120 can engage to prevent relative rotation of the drive module 12' and the pump module 12 with drive module 12' in the desired orientation for pumping.

In the example shown in FIGS. 14-15C, drive module 12' is shifted both vertically and laterally relative to pump module 12 during mounting and dismounting. During mounting, at least a portion of drive module 12' is lifted vertically over piston assembly 72 to allow piston assembly 72 to pass into central aperture 108 defined by upper plate 36. Drive module 12' is then shifted vertically to cause upper plate 36 to engage with and be supported by mounting plate 50. Projection 126 is at least partially disposed within recess 128. Head 84 of piston cap 78 is aligned with slot 98 of connector 60. Drive module 12' is shifted laterally to cause head 84 to enter into slot 98 and to cause lip 136 to enter into recess 128. Head 84 entering into slot 98 forms the dynamic connection interface and lip 136 entering into recess 128 locks the static connection interface.

Drive module 12' can be dismounted from pump module 12 in the reverse of the mounting process. Drive module 12' is initially shifted laterally relative to pump module 12 to remove head 84 from slot 98 and remove lip 136 from recess 128. Drive module 12' can then be lifted vertically off of pump module 12.

Figure 16A:
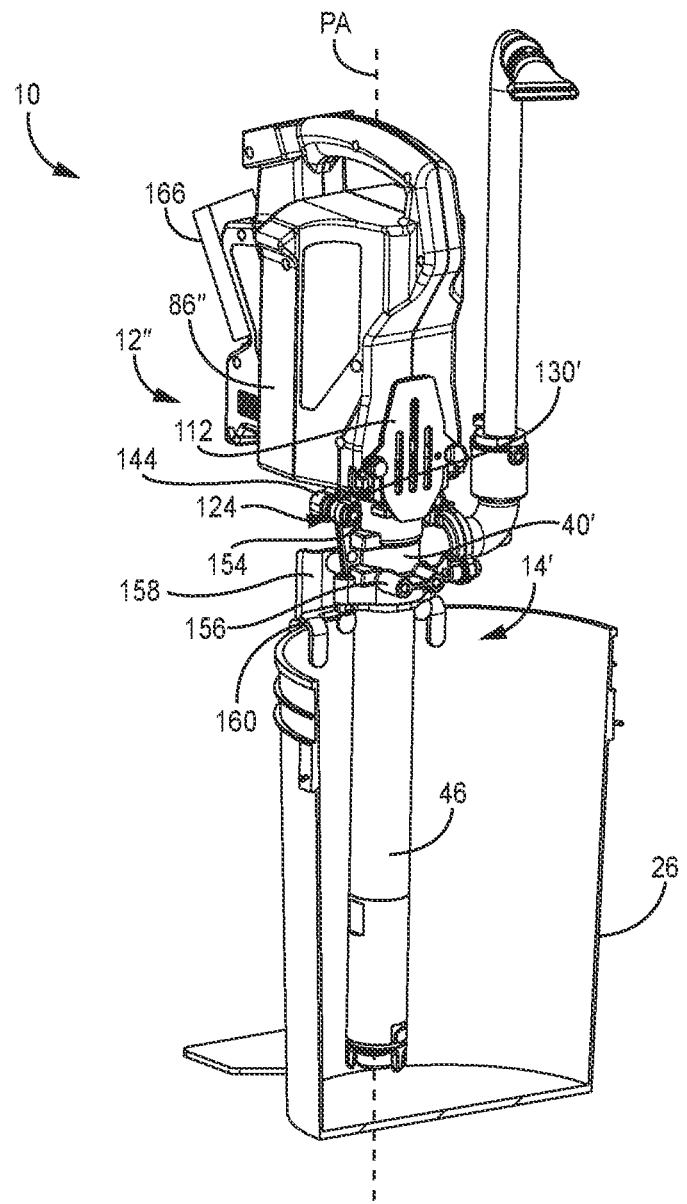
FIG. 16A is an isometric view of a pump assembly mounted to a fluid tank.
Figure 16B:
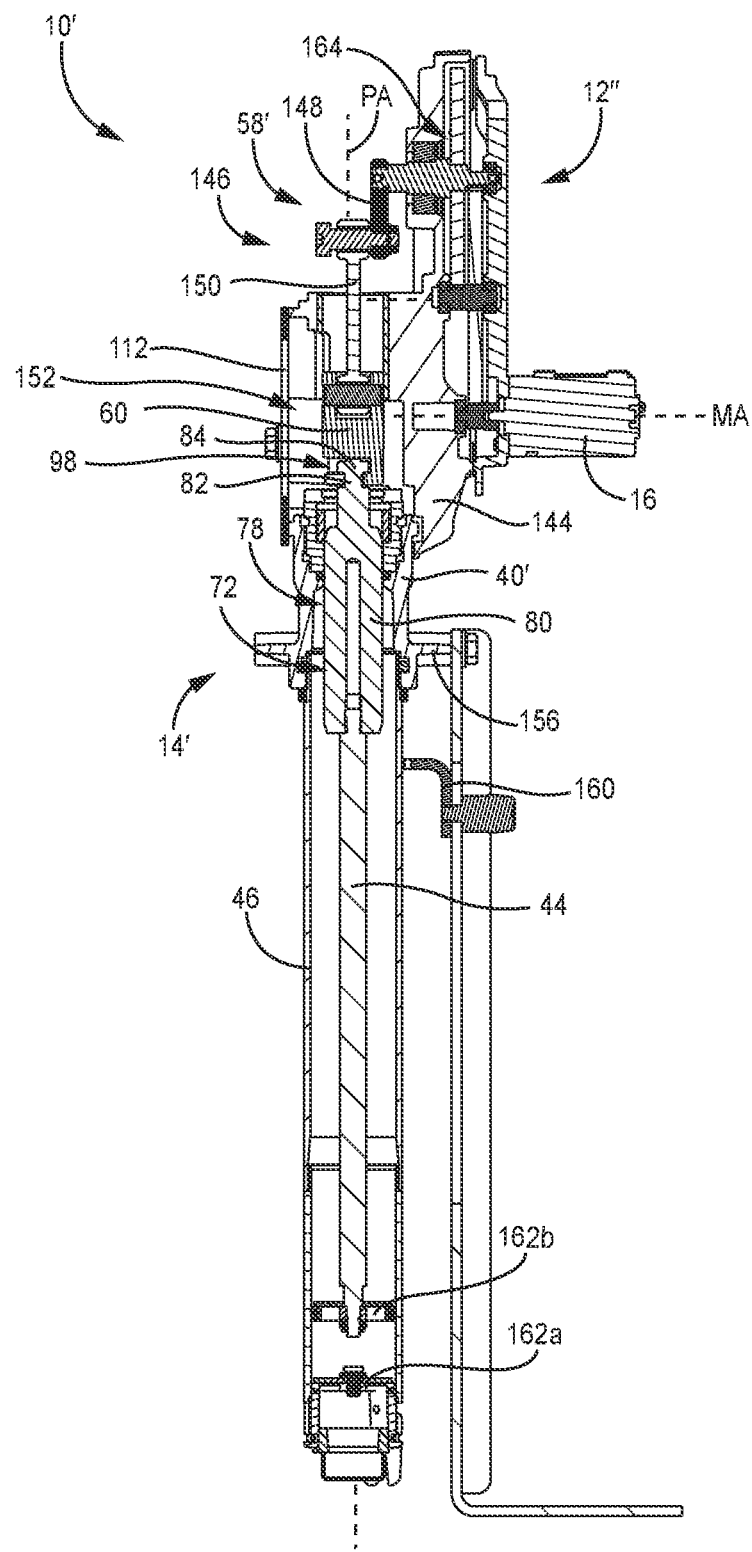
Figure 16C:
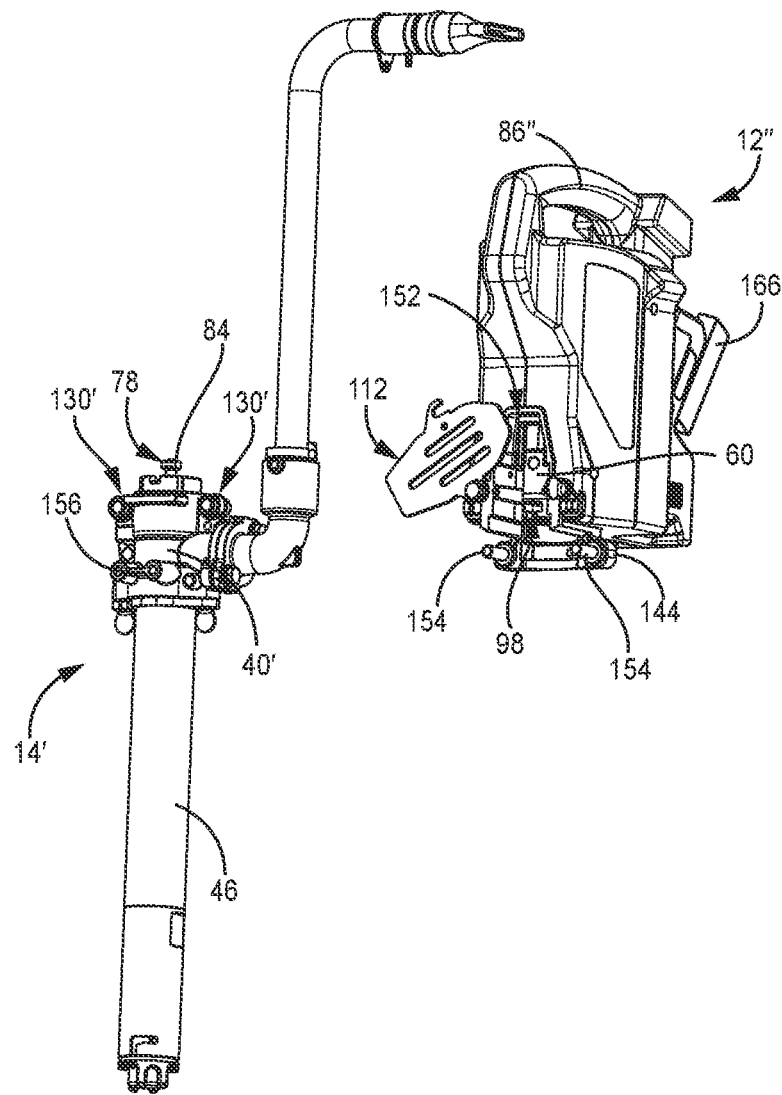
FIG. 16C is an isometric partially exploded view of the pump assembly shown in FIG. 16A.

FIG. 16A is an isometric view of a pump assembly 10' mounted to a fluid tank 26. FIG. 16B is a cross-sectional view of pump assembly 10' taken along line B-B in FIG. 16A and with motor housing 86" removed. FIG. 16C is an isometric partially exploded view of pump assembly 10'.

Figure 16D:
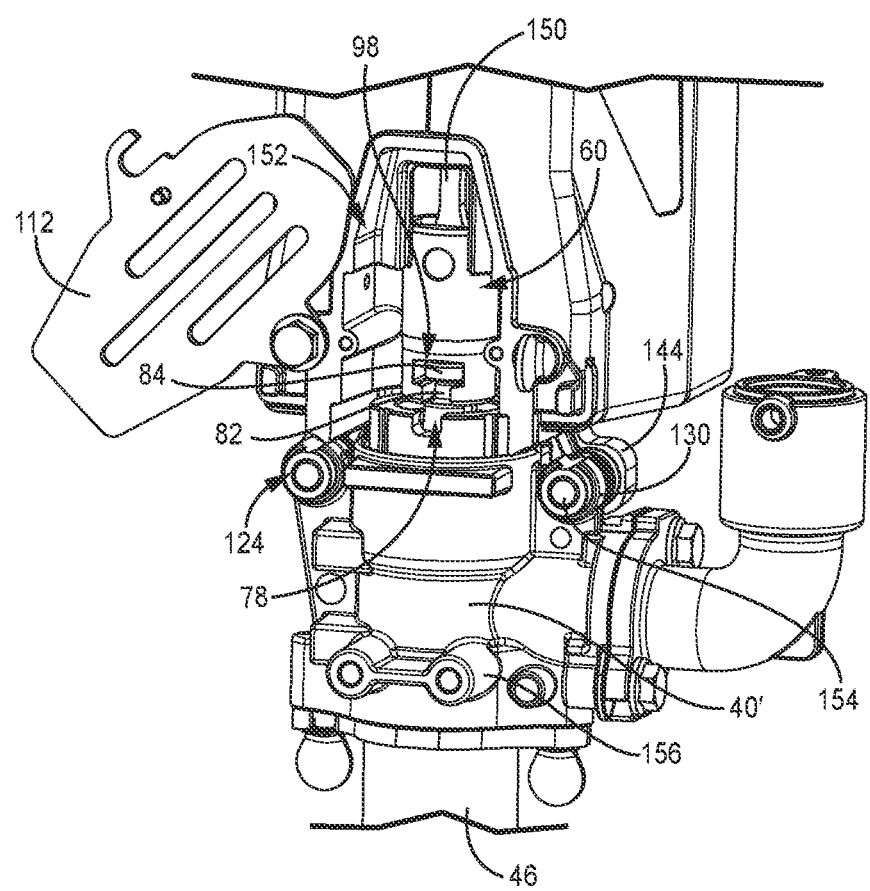
FIG. 16D is an enlarged isometric view of the interface between a drive module and a pump module.

FIG. 16D is an enlarged isometric view of the interface between drive module 12" and pump module 14'. FIGS. 16A-16D will be discussed together. Drive module 12" and pump module 14' of pump assembly 10' are shown. Motor 16, drive 58', drive module support 144, door 112, and connector 60 of drive module 12" are shown. Drive 58' includes crank 146 having eccentric 148 and arm 150. Drive module support 144 defines drive cavity 152 and includes posts 154. Pump module 14' includes mounting base 40' and piston assembly 72. Mounting base 40' includes receivers 130' and stand interface 156.

Pump assembly 10' is substantially similar to pump assembly 10 (best seen in FIG. 3A) in that pump assembly 10' includes a drive module 12" that is structurally supported by and disposed on pump module 14'. Pump module 14' can fully support drive module 12" relative to fluid tank 26. Pump module 14' is itself supported relative to the ground surface by fluid tank 26. In the example shown, stand 158 is connected to pump assembly 10' to support and stabilize pump assembly 10'. Stand 158 is directly connected to pump module 14'. Stand 158 is connected to mounting base 40' at stand interface 156, which is a projection extending from mounting base 40'. In the example shown, stand 158 is disposed at least partially outside of fluid tank 26 while cylinder 46 is disposed within fluid tank 26. Stand 158 contacts fluid tank 26 at bracket 160 of stand 158 to support pump module 14' on the fluid tank 26. Pump module 14' can support itself freestanding on the fluid tank 26 in this manner While stand 158 is described as contacting the ground, it is understood that some examples of pump assembly 10' may be fully supported by fluid tank 26 without another component separately contacting the ground surface.

Piston assembly 72 extends from outside of mounting base 40', through mounting base 40', and into cylinder 46. Cylinder 46 can be in direct contact with the material being pumped while pump module 14' is mounted to fluid tank 26. Cylinder 46 is connected to mounting base 40'. Check valves 162a, 162b are disposed at an end of pump assembly 10' opposite piston cap 78. Check valve 162a is a static check valve that is at a set location along pump axis PA during reciprocation of piston assembly 72. Check valve 162b is connected to piston assembly 72 to reciprocate with piston assembly 72. In the example shown, pump module 14' includes a double displacement pump that can output fluid during both an upstroke and a downstroke.

Drive module 12" is mountable to and dismountable from pump module 14'. Drive module 12" is supported by pump module 14'. Drive module 12" is configured to power pump module 14' to cause reciprocation of piston assembly 72 and thus pumping by pump module 14'. Motor 16 is supported by drive module support 144. Motor housing 86" encloses motor 16. Motor 16 is an electric motor in the example shown, but it is understood that motor 16 can be of any desired configuration suitable for powering pump module 14', such as a pneumatic motor, a hydraulic motor, etc. In the example shown, battery 166 is supported by motor housing 86" and is configured to provide power to motor 16. Motor 16 is operably connected to drive 58'. Drive 58' is configured to convert a rotational output from motor 16 into a linear reciprocating input to piston assembly 72. In the example shown, gearing 164 is disposed between and connects motor 16 and drive 58'. Gearing 164 is configured to reduce the speed and increase the torque output by motor 16 to drive 58'. It is understood, however, that not all examples include gearing 164 such that motor 16 can be directly connected to drive 58'.

Drive 58' includes eccentric 148 configured to be rotated by motor 16. Arm 150 extends between eccentric 148 and connector 60. Eccentric 148 and arm 150 convert the rotational output from motor 16 into the linear reciprocating input to connector 60 to cause reciprocation of connector 60 along the pump axis PA, thereby reciprocating piston assembly 72 along pump axis PA.

In the example shown, drive module support 144 interfaces with mounting base 40' to form a static connection between drive module 12" and pump module 14'. Locking interface 124 is formed between drive module 12" and pump module 14' to prevent drive module 12" from being shifted vertically relative to pump module while the locking interface 124 is engaged. In the example show, the locking interface is formed by posts 154 engaging receivers 130'. Posts 154 extend from drive module support 144 to form the static interface component of drive module 12". Receivers 130' form the static interface component of pump module 14'. Posts 154 extend into the bores of receivers 130' to mount drive module 12" to pump module 14'. Posts 154 are configured to slide within the bores of receivers 130' during mounting and dismounting of drive module 12". In the example shown, posts 154 can enter into receivers 130' from either end of the bore through receivers 130'. Drive module 12" can thus be mounted to pump module 14' in multiple orientations. Posts 154 engaging receivers 130' can both structurally support drive module 12" on pump module 14' and form the locking interface 124 between drive module 12" pump module 14'.

Drive cavity 152 is at least partially defined by drive module support 144. Door 112 is connected to drive module support 144. Door 112 is configured to pivot between an open state, exposing drive cavity 152 to allow piston cap 78 to enter into or exit from drive cavity 152, and a closed state, enclosing drive cavity 152 and preventing piston cap 78 from entering into or passing out of drive cavity 152. Connector 60 is at least partially disposed in drive cavity 152. Connector 60 is a dynamic interface component of drive module 12" and is configured to cause reciprocation of piston assembly 72 to cause pumping by pump module 14'. Slot 98 is formed in connector 60 and is configured to receive head 84 of piston cap 78. The interface between connector 60 and piston cap 78 forms the dynamic interface between drive module 12" and pump module 14'.

In the example shown, motor axis MA is oriented transverse to pump axis PA with drive module 12" mounted to pump module 14'. In the example shown, motor axis MA is configured to be orthogonal to pump axis PA. During mounting and dismounting, drive module 12" can shift axially relative to motor axis MA and laterally relative to pump axis PA. The lateral shifting of drive module 12" can be in a direction orthogonal to the pump axis PA.

During mounting, drive module 12" is oriented relative to pump module 14' to align posts 154 with receivers 130' and align piston cap 78 with connector 60. Drive module 12" is shifted laterally relative to pump axis PA and towards pump module 14'. Posts 154 enter into the bore of receivers 130'. Drive module support 144 is thus in contact with mounting base 40' and can slide relative to mounting base 40' at the contact point(s). Drive module 12" is shifted laterally such that posts 154 fully enter into receivers 130' and such that head 84 enters into slot 98. Door 112 can be pivoted to the closed state to secure the static connection and prevent drive module 12" from being pulled laterally off of pump module 14'. For example, door 112 can interface with a portion of mounting base 40' to prevent relative lateral movement between drive module 12" and pump module 14' while door 112 is in the closed state. Door 112 further provides a pinch guard. In the example shown, drive module 12" is mountable is two orientations relative to pump module 14'. Posts 154 can enter into receivers 130' from either end of receivers 130'.

Drive module 12" can be dismounted from pump module 14' in the reverse of the mounting process. Door 112 is placed in the open state to expose drive cavity 152 and allow for lateral movement of drive module 12" relative to pump module 14' and pump axis PA. Drive module 12" is shifted laterally relative to pump module 14' to break the dynamic interface between connector 60 and piston cap 78 by removing head 84 from slot 98. Drive module 12" is shifted laterally relative to pump module 14' to break the locking interface 124 between posts 154 and receivers 130'. In some examples, drive module 12" and pump module 14' are sized such that the dynamic interface is formed after the static interface during mounting and such that the dynamic interface is broken prior to the static interface during dismounting. Such relative sizing prevents undesirable off-center forces from being exerted on piston assembly 72 during mounting and dismounting. The static interface ensures linear sliding motion when the dynamic interface is formed and broken. As such, the static interface prevents drive module 12" from shifting vertically relative to pump module 14' or tipping relative to pump module 14' while head 84 is within slot 98.

Figure 17A:
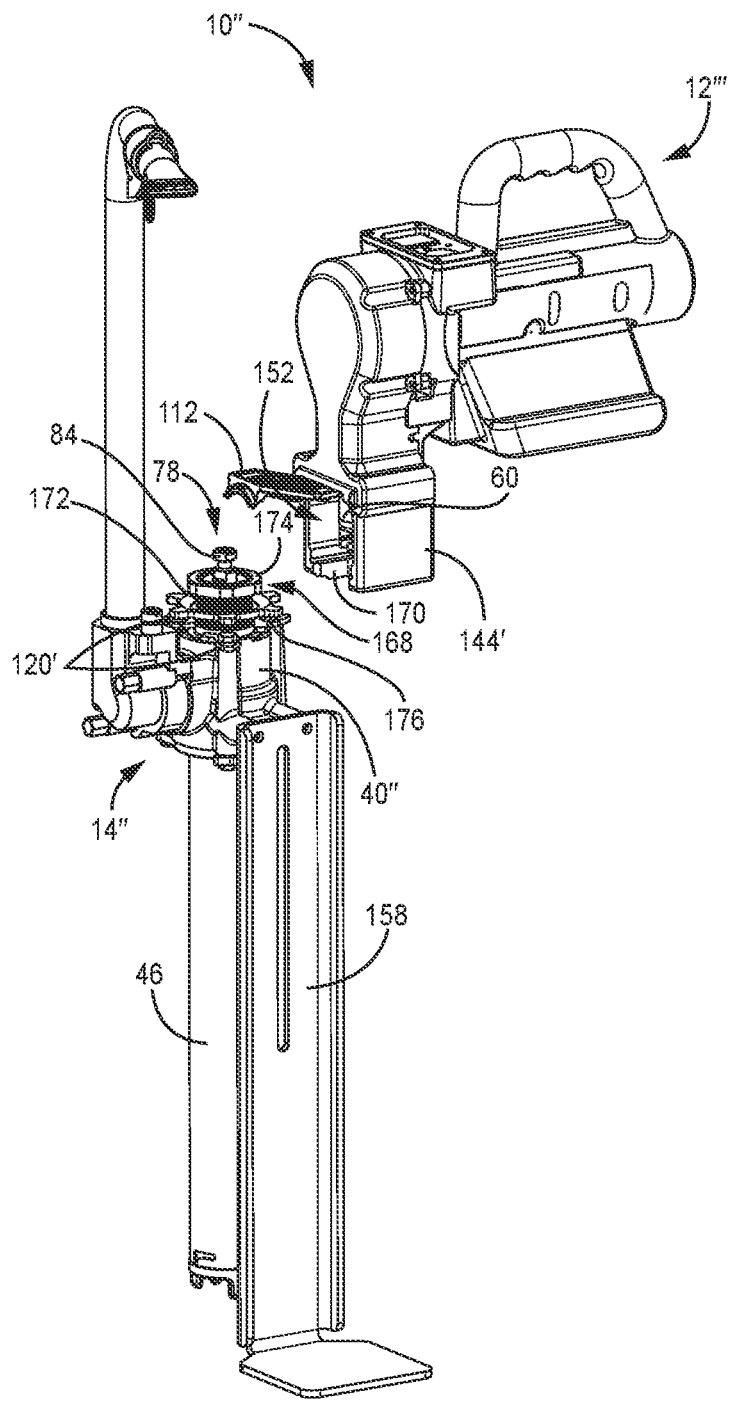
FIG. 17A is an isometric exploded view of a pump assembly showing a drive module dismounted from a pump module.
Figure 17B:
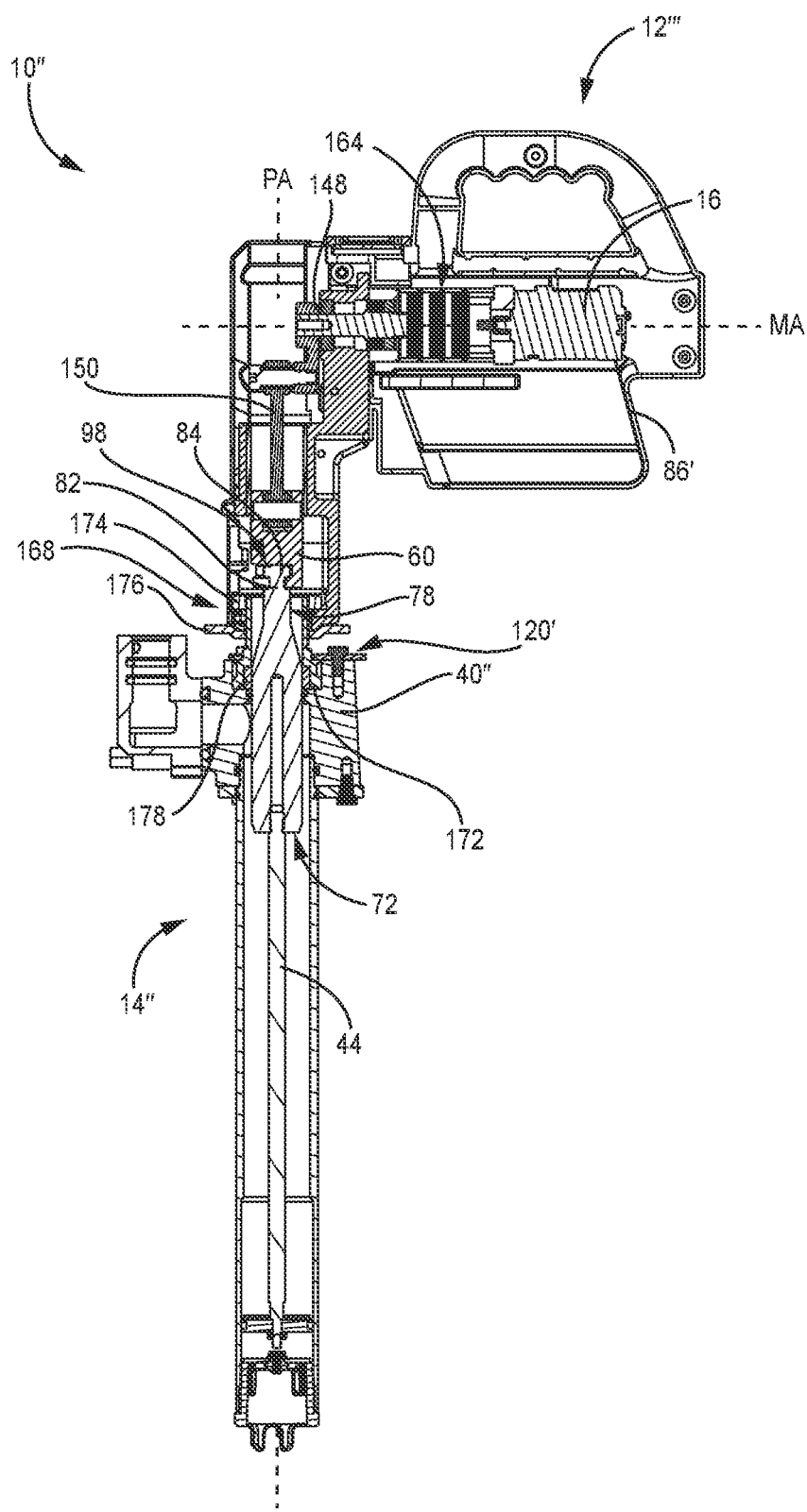
FIG. 17B is a cross-sectional view of the pump assembly shown in FIG. 17A with the drive module mounted on the pump module.

FIG. 17A is an isometric exploded view of pump assembly 10" showing drive module 12' dismounted from pump module 14". FIG. 17B is a cross-sectional view of pump assembly 10" with drive module 12'" mounted on pump module 14". Motor 16, drive 58', drive module support 144', door 112, and connector 60 of drive module 12' are shown. Drive 58' includes crank 146 having eccentric 148 and arm 150. Drive module support 144' includes drive cavity 152 and mounting ledge 170. Pump module 14" includes mounting base 40" and piston assembly 72. Mounting base 40" includes fluid outlet manifold 52, stand interface 156, and adaptor 172. Clamp 168 includes support ring 174 and securing ring 176.

Pump assembly 10" is substantially similar to pump assembly 10 (best seen in FIG. 3A), and pump assembly 10' (FIGS. 16A-16C) in that pump module 14" structurally supports drive module 12'" with drive module 12'" mounted on pump module 14". Drive module 12'" is supported only by pump module 14" and not by other structure apart from pump module 14". Pump module 14" is itself supported by fluid tank 26, either fully or partially.

Adaptor 172 is supported by mounting base 40". Piston assembly 72 extends through adaptor 172. Adaptor 172 can be in the form of a tube that is at least partially disposed within mounting base 40". Guide bushing 178 is disposed within adaptor 172 and interfaces with piston assembly 72. Guide bushing 178 assists in aligning piston assembly 72 on pump axis PA to maintain reciprocation of piston assembly 72 coaxial with pump axis PA. Guide bushing 178 further facilitates rotation of adaptor 172, and thus of drive module 12'", relative to piston assembly 72 and about pump axis PA, as discussed in more detail below. Fasteners 120' are configured to interface with a top surface of adaptor 172. Fasteners 120' can be placed in a locked state to lock an orientation of drive module 12'" about pump axis PA. Fasteners 120' can be placed in an unlocked state to allow for rotation of adaptor 172 and drive module 12'" about pump axis PA while drive module 12'" remains mounted to pump module 14". In the example shown, fasteners 120' are located on mounting base 40" and can rotate to cover or uncover portions of adaptor 172 to allow release of the adaptor 172 relative to mounting base 40" or to secure adaptor 172 to mounting base 40".

Drive module 12'" is connected to pump module 14" by a static connection interface and a dynamic connection interface. In the example shown, the dynamic interface is formed by head 84 of piston cap 78 extending into receiving slot 98 of connector 60. In the example shown, the static interface is formed between clamp 168 and drive module support 144'. Receiver 130" of pump assembly 10" is formed by clamp 168 and is configured to interface with mounting ledge 170. As such, the receiver of pump assembly 10" is formed on pump module 14" and drive module 12' includes the insert formed by mounting ledge 170. Drive module 12'" can mount to pump module 14" by shifting axially relative to motor axis MA and laterally relative to pump axis PA.

Clamp 168 is disposed on an exterior of adaptor 172. The exterior of adaptor 172 includes threading configured to interface with threading formed on one or both of support ring 174 and securing ring 176. Support ring 174 can be statically connected to adaptor 172. Securing ring 176 is disposed on adaptor 172 between support ring 174 and mounting base 40". With drive module 12'" mounted to pump module 14", support ring 174 is disposed within drive cavity 152 and securing ring 176 is disposed outside of drive cavity 152. Door 112 is movable to cover and uncover the front opening of drive cavity 152. In the example shown, door 112 is configured to pivot up and away from the front opening of drive cavity 152 when moving from the closed position to the open position.

Mounting ledge 170 is formed around the bottom opening of drive cavity 152 and is received in a gap between support ring 174 and securing ring 176. Support ring 174 is configured to interface with a top surface of mounting ledge 170 and securing ring 176 is configured to interface with a bottom surface of mounting ledge 170. Securing ring 176 is movable relative to adaptor 172 and along pump axis PA to alter the size of the gap formed between support ring 174 and securing ring 176. For example, securing ring 176 can be rotated to thread securing ring 176 upwards towards support ring 174 to reduce the size of the gap and secure mounting ledge 170 between support ring 174 and securing ring 176. Engagement of clamp 168 secures drive module 12'" to pump module 14" while disengagement of clamp 168 can unsecure drive module 12'" relative to pump module 14" for separation. The interface between clamp 168 and drive module support 144' structurally connects drive module 12'" to pump module 14" such that drive module 12'" is supported by pump module 14". Clamp 168 further forms a locking interface 124 between drive module 12'" and pump module 14" that prevents vertical displacement of drive module 12'" relative to pump module 14". While pump assembly 10" is shown as including clamp 168 for forming the static connection, it is understood that other attachment mechanism options are possible. Moreover, while clamp 168 is shown as including a threaded interface with adaptor 172, it is understood that not all examples are so limited.

The entirety of drive module 12'" can rotate about axis PA relative to pump module 14" while drive module 12'" is mounted to pump module 14". Drive module 12'" can rotate about pump axis PA relative to pump module 14" while clamp 168 is in a secured state. This allows for the cantilevered motor housing 86' to be pointed in any one of 360-degrees relative to pump axis PA based on the preference of the user. Drive module 12'" can be initially mounted to pump module 14" from any desired mounting orientation. Drive module 12'" can then be rotated about pump axis PA while supported by pump module 14", such as with clamp 168 in the secured state, to a desired operational orientation. Drive module 12''' can be rotated to the desired operating orientation while drive module 12''' remains statically and dynamically connected to pump module 14". Fasteners 120' can be placed in a locked state to lock the orientation of drive module 12''' relative to pump module 14" and thus prevent relative rotation.

Figure 18:
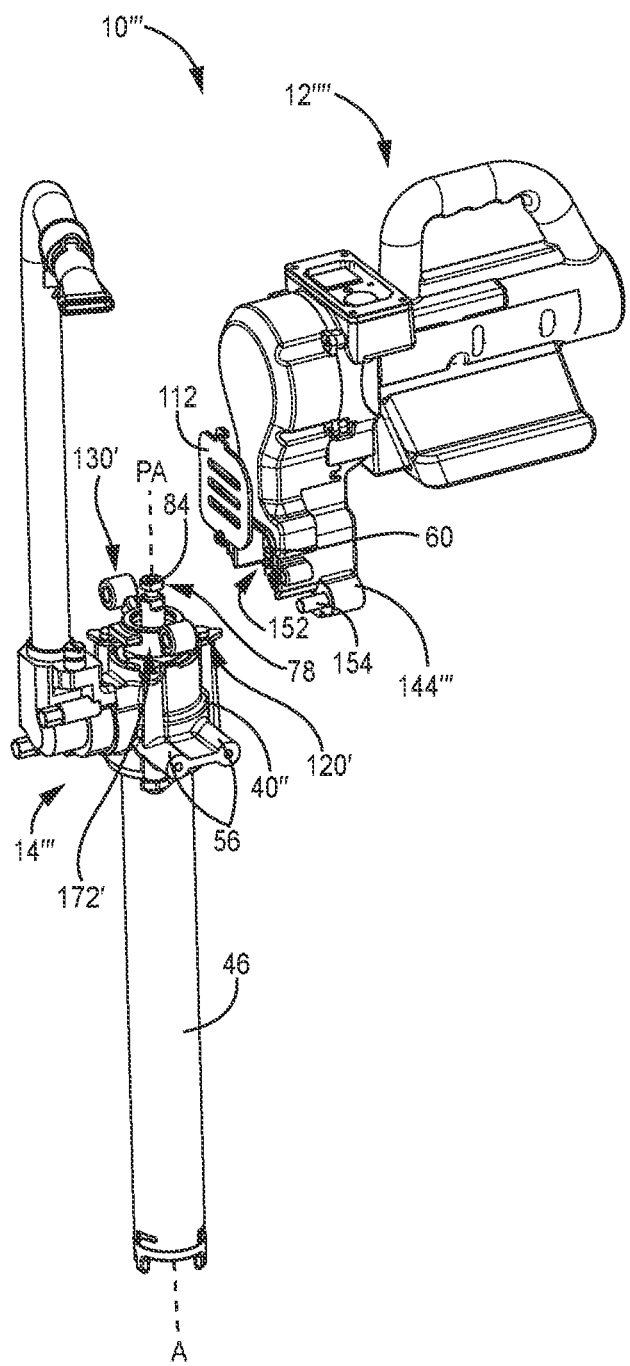
FIG. 18 is an isometric view of a pump assembly.

FIG. 18 is an isometric view of pump assembly 10'''. Drive module 12'''' and pump module 14''' of pump assembly 10''' are shown. Drive module support 144''' and door 112 of drive module 12'''' are shown. Drive module support 144''' defines drive cavity 152 and includes posts 154. Mounting base 40" and piston cap 78 of pump module 14''' are shown. Mounting base 40" includes receivers 130' and adaptor 172'.

Pump assembly 10''' is substantially similar to pump assembly 10 (best seen in FIG. 3A), pump assembly 10' (FIGS. 16A-16C), and pump assembly 10" (FIGS. 17A and 17B) in that pump assembly 10''' includes a pump module 14''' that structurally supports a drive module 12'''' with drive module 12'''' mounted on pump module 14'''. Drive module 12'''' is supported only by pump module 14''' and not by other structure apart from pump module 14'''. Pump module 14''' is itself supported by fluid tank 26, either fully or partially. Drive module 12'''' is mountable to and removable from pump module 14''' while pump module 14''' itself remains stationary, such as by being mounted on and at least partially supported by a fluid tank 26.

Drive module 12'''' can be shifted laterally relative to pump module 14''' during mounting and dismounting. Drive module 12'''' is connected to pump module 14''' by a static connection interface and a dynamic connection interface. The static connection interface is formed between drive module support 144''' and mounting base 40". More specifically, the static connection interface is formed between posts 154 and receivers 130'. The dynamic connection interface is formed between piston assembly 72 and connector 60 (as best seen in FIGS. 12A, 12B, and 16D). More specifically, the dynamic connection interface is formed between head 84 of piston cap 78 and slot 98 of connector 60.

In the example shown, receivers 130' are formed as part of adaptor 172'. Adaptor 172' can be rotated about pump axis PA while drive module 12'''' is mounted to pump module 14'''. As such, drive module 12'''' can be rotated to any desired orientation about pump axis PA while posts 154 are disposed in the bores of receivers 130' and while head 84 is disposed in slot 98. Drive module 12'''' can be secured in the desired orientation by placing fasteners 120' in the locked state.

While the invention has been described with reference to an exemplary embodiment(s), it will be understood by those skilled in the art that various changes may be made and equivalents may be substituted for elements thereof without departing from the scope of the invention. For example, while the fluid displacement members of the pump modules have been described as pistons, other embodiments of could include a diaphragm as the fluid displacement member connected to the drive shaft #. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims. Also, while some options are shown, those options do not need to be present, and some aspects could be removed or substituted. For example, a bolt or threading may be shown to fasten two components, but the components could be fastened in other ways without departing from the scope of this disclosure.

The invention claimed is:

1. A pump assembly configured to pump material from a fluid tank having an opening into the fluid tank, the pump assembly comprising:
   a pump module comprising:
      a mounting base having a mounting plate that has an upper surface;
      a cylinder extending from the mounting base in a first axial direction along a pump axis; and
      a piston assembly extending into the cylinder, the piston assembly configured to reciprocate along the pump axis to pump material from the fluid tank; and
   a drive module removably mountable to the pump module, the drive module comprising:
      a motor operably connected to the piston assembly by a dynamic interface; and
      a drive module support configured to interface with the mounting base at a static interface, the drive module support including an upper plate having a lower surface, wherein the lower surface interfaces with the upper surface such that the drive module is supported on the pump module at the static interface;
   wherein the upper plate is configured to slide relative to the mounting plate to shift the drive module relative to the piston assembly to form the dynamic interface during mounting and to shift the drive module relative to the piston assembly to break the dynamic interface during dismounting of the drive module.

2. The pump assembly of claim 1, wherein the drive module is mountable to the pump module in a plurality of orientations.

3. The pump assembly of claim 1, wherein the dynamic interface is a slotted interface.

4. The pump assembly of claim 3, wherein the slotted interface is formed by a head of the piston assembly and a connector of the drive module, the connector including a slot for receiving the head.

5. The pump assembly of claim 4, wherein the connector is operably connected to the motor to be reciprocated by the motor.

6. The pump assembly of claim 1, further comprising:
   a fastener that secures the drive module to the pump module to prevent the drive module from moving relative to the pump module.

7. The pump assembly of claim 1, wherein the upper plate directly interfaces with the mounting plate.

8. The pump assembly of claim 7, wherein the entirety of the weight of the drive module rests on the mounting plate of the pump module.

9. The pump assembly of claim 1, wherein the lower surface is a first flat surface and the upper surface is a second flat surface, and wherein the lower surface rests directly on the upper surface.

10. The pump assembly of claim 9, wherein the pump module comprises a projection that extends above the upper surface.

11. The pump assembly of claim 10, wherein the projection comprises a receiver that receives a lip of the drive module to prevent vertical movement of the drive module relative to the pump module with the lip received in the receiver.

12. The pump assembly of claim 9, wherein the drive module comprises a projection that extends below the upper flat surface.

13. The pump assembly of claim 12, wherein the projection comprises a receiver that receives a lip of the pump module.

14. The pump assembly of claim 1, wherein the pump module remains stationary while the drive module is mounted to and dismounted from the pump module.

15. The pump assembly of claim 14, wherein the pump module remains fixed to a drum and is entirely supported by the drum while the drive module is mounted to and dismounted from the pump module, and wherein the drum forms the fluid tank.

16. The pump assembly of claim 1, wherein the drive module is rotatable about the pump axis when mounted on the pump module.

17. A pump assembly configured to pump material from a fluid tank having an opening into an interior of the fluid tank, the pump assembly comprising:
   a pump module configured to extend at least partially through the opening and into the fluid tank to contact a material within the fluid tank, the pump module including a piston configured to reciprocate along a pump axis to pump the material;
   a drive module removably mounted to the pump module by a static interface and a dynamic interface, wherein the drive module is operatively connected to the piston at the dynamic interface to power reciprocation of the piston, and wherein the drive module is structurally supported on the pump module at the static interface;
   wherein the drive module is configured to shift radially relative to the pump module and towards the pump axis to form the dynamic interface and the static interface during mounting and the drive module is configured to shift radially away from the pump axis to break the static interface and the dynamic interface; and
   wherein the drive module is mountable to the pump module from a plurality of orientations.

18. A pump module configured to pump fluid from a fluid tank, the pump module comprising:
   a mounting base configured to support the pump module relative to the fluid tank, the mounting base including a flat upper face;
   a piston assembly extending into the fluid tank, the piston assembly configured to reciprocate along a pump axis to pump material from the fluid tank, wherein a connecting end of the piston assembly extends in a first axial direction out of the mounting base;
   a projection extending from the flat upper face of the mounting base in the first axial direction, wherein the projection comprises a receiver defining a gap between the flat upper face of the mounting base and a bottom edge of the receiver, the gap configured to receiver a projection to inhibit axial movement of the projection disposed in the gap.

* * * * *